(12) United States Patent
Park et al.

(10) Patent No.: US 12,108,132 B2
(45) Date of Patent: Oct. 1, 2024

(54) CAMERA HAVING MOVABLE IMAGE SENSOR AND ELECTRONIC DEVICE INCLUDING THE SAME

(71) Applicant: Samsung Electronics Co., Ltd., Suwon-si (KR)

(72) Inventors: Jaeheung Park, Suwon-si (KR); Kwangseok Byon, Suwon-si (KR); Hwajoong Jung, Suwon-si (KR); Bongchan Kim, Suwon-si (KR); Taehwan Kim, Suwon-si (KR); Hyungjin Rho, Suwon-si (KR); Kihuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 152 days.

(21) Appl. No.: 17/727,296

(22) Filed: Apr. 22, 2022

(65) Prior Publication Data

US 2022/0345598 A1  Oct. 27, 2022

Related U.S. Application Data

(63) Continuation of application No. PCT/KR2022/005333, filed on Apr. 13, 2022.

(30) Foreign Application Priority Data

Apr. 22, 2021 (KR) .................. 10-2021-0052646
Aug. 24, 2021 (KR) .................. 10-2021-0111467

(51) Int. Cl.
*H04N 23/55* (2023.01)
*G02B 27/64* (2006.01)
*H04N 23/54* (2023.01)

(52) U.S. Cl.
CPC .......... *H04N 23/55* (2023.01); *G02B 27/646* (2013.01); *H04N 23/54* (2023.01)

(58) Field of Classification Search
CPC ....... G02B 27/646; H04N 23/54; H04N 23/55
See application file for complete search history.

(56) References Cited

U.S. PATENT DOCUMENTS 8,041,201 B2   10/2011   Eromaki et al.
8,248,497 B2   8/2012    Tanimura et al.
(Continued)

FOREIGN PATENT DOCUMENTS

CN   111683454 A   9/2020
JP   2019-512734 A  5/2019
(Continued)

OTHER PUBLICATIONS

International Search Report and Written Opinion dated Jul. 19, 2022 in connection with International Patent Application No. PCT/KR2022/005333, 10 pages.

*Primary Examiner* — Antoinette T Spinks

(57) ABSTRACT

An electronic device including a camera module is provided. The camera module includes a lens assembly including a lens, a lens holder in which the lens assembly is fixedly disposed, a sensor carrier that includes an image sensor at least partially aligned with an optical axis of the lens and a circuit board electrically connected with the image sensor and that moves in a first axial direction perpendicular to the optical axis and a second axial direction perpendicular to the optical axis and the first axial direction, a fixed substrate adjacent to the sensor carrier and fixed in a specified position, and a connecting member that extends from the circuit board to the fixed substrate and that extends to surround at least three interconnected edges of the circuit board when viewed in a direction of the optical axis.

19 Claims, 22 Drawing Sheets

(56) References Cited

U.S. PATENT DOCUMENTS

| | | |
|---|---|---|
| 9,225,886 B2 | 12/2015 | Yeo |
| 10,247,953 B2 | 4/2019 | Yeo |
| 10,904,440 B2 | 1/2021 | Kuo et al. |
| 10,924,675 B2 | 2/2021 | Hubert et al. |
| 11,048,147 B2 | 6/2021 | Sharma |
| 11,057,564 B2 | 7/2021 | Johnson et al. |
| 11,159,729 B2 | 10/2021 | Kuo et al. |
| 2008/0198249 A1 | 8/2008 | Tanimura et al. |
| 2009/0252488 A1 | 10/2009 | Eromaki et al. |
| 2016/0085087 A1 | 3/2016 | Yeo |
| 2019/0141248 A1 | 5/2019 | Hubert et al. |
| 2020/0036898 A1 | 1/2020 | Kuo et al. |
| 2020/0314338 A1 | 10/2020 | Johnson et al. |
| 2021/0080807 A1 | 3/2021 | Sharma |
| 2021/0112200 A1 | 4/2021 | Kuo et al. |
| 2021/0168289 A1 | 6/2021 | Hubert et al. |
| 2021/0337121 A1 | 10/2021 | Johnson et al. |
| 2022/0086317 A1 | 3/2022 | Paik et al. |
| 2022/0191359 A1 | 6/2022 | Oh |
| 2022/0345629 A1* | 10/2022 | Park .................. H04N 23/687 |

FOREIGN PATENT DOCUMENTS

| | | |
|---|---|---|
| KR | 10-2016-0121684 A | 10/2016 |
| KR | 10-2020-0086077 A | 7/2020 |
| KR | 10-2020-0114251 A | 10/2020 |
| KR | 10-2021-0034205 A | 3/2021 |

* cited by examiner

CAMERA HAVING MOVABLE IMAGE SENSOR AND ELECTRONIC DEVICE INCLUDING THE SAME

CROSS-REFERENCE TO RELATED APPLICATIONS

This application is a Bypass Continuation of International Application No. PCT/KR2022/005333 filed Apr. 13, 2022, which claims priority to Korean Patent Application No. 10-2021-0052646, filed Apr. 22, 2021, and Korean Patent Application No. 10-2021-0111467, filed Aug. 24, 2021, the disclosures of which are herein incorporated by reference in their entirety.

BACKGROUND

1. Field

Embodiments of the disclosure described herein relate to a camera module and an electronic device including the same.

2. Description of Related Art

A camera module may perform an image stabilization function (e.g., optical image stabilization (OIS), digital image stabilization (DIS), or electrical image stabilization (EIS)) for correction of an image in response to disturbances. The image stabilization function may be implemented by a method of moving a lens assembly to change the position of light that an image sensor receives. The camera module may include at least one coil and at least one magnet for the image stabilization function. The coil to which an electric current is applied may electromagnetically interact with the magnet to generate an electromagnetic force.

SUMMARY

In the case of moving the lens assembly to perform the image stabilization function (e.g., optical image stabilization (OIS)), a magnet and a coil that provide a driving force sufficient to move the lens assembly may be used. With an increase in the sizes and number of lenses included in the lens assembly, a larger magnet and a higher electric current may be used.

Embodiments of the disclosure provide a camera module for moving an image sensor rather than a lens assembly through a relatively small magnet and a coil with low current consumption.

The technical problems to be solved by the disclosure are not limited to the aforementioned problems, and any other technical problems not mentioned herein will be clearly understood from the following description by those skilled in the art to which the disclosure pertains.

According to embodiments of the disclosure, an electronic device including a camera module is disclosed. The camera module includes a lens assembly including a lens, a lens holder in which the lens assembly is fixedly disposed, a sensor carrier that includes an image sensor at least partially aligned with an optical axis of the lens and a circuit board electrically connected with the image sensor and that moves in a first axial direction perpendicular to the optical axis and a second axial direction perpendicular to the optical axis and the first axial direction, a first drive member that moves the sensor carrier in the first axial direction and that includes a first coil disposed on one of the lens holder or the sensor carrier and a first magnet disposed on the other, a second drive member that moves the sensor carrier in the second axial direction and that includes a second coil disposed on one of the lens holder or the sensor carrier and a second magnet disposed on the other, a fixed substrate adjacent to the sensor carrier and fixed in a specified position, and a connecting member that extends from the circuit board to the fixed substrate and that extends to surround at least three interconnected edges of the circuit board when viewed in a direction of the optical axis. The connecting member includes at least one slit that extends in an extension direction of the connecting member.

According to embodiments of the disclosure, an electronic device includes a housing and a camera module that is disposed in the housing and that receives light through a partial area of the housing. The camera module includes a lens assembly including a lens, a lens holder in which the lens assembly is fixedly disposed, a sensor carrier that includes an image sensor at least partially aligned with an optical axis of the lens and a circuit board electrically connected with the image sensor and that moves in a first direction perpendicular to the optical axis and a second direction perpendicular to the optical axis and the first direction, a first drive member that moves the sensor carrier in the first direction and that includes a first coil disposed on one of the lens holder or the sensor carrier and a first magnet disposed on the other, a second drive member that moves the sensor carrier in the second direction and that includes a second coil disposed on one of the lens holder or the sensor carrier and a second magnet disposed on the other, a fixed substrate adjacent to the sensor carrier and fixed in a specified position, and a connecting member that extends from the circuit board to the fixed substrate and that includes a first area connected to the fixed substrate and having first slits that extend in the second direction and a second area having second slits that extend in the first direction. At least one of the first magnet or the first coil is disposed to at least partially overlap the first area of the connecting member when viewed in a direction of the optical axis, and at least one of the second magnet or the second coil is disposed to at least partially overlap the second area of the connecting member when viewed in the direction of the optical axis.

According to the embodiments of the disclosure, the camera module may drive the image sensor that is lighter in weight than a structure moving the lens assembly. Accordingly, compactness of the camera module and high energy efficiency may be achieved.

According to the embodiments of the disclosure, the camera module may include the FPCB capable of supporting a movement of the circuit board in an image stabilization operation as a flexible printed circuit board (FPCB) connecting the fixed substrate and the circuit board.

In addition, the disclosure may provide various effects that are directly or indirectly recognized.

Before undertaking the detailed description below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

With regard to description of the drawings, identical or similar reference numerals may be used to refer to identical or similar components.

DETAILED DESCRIPTION

FIGS. 1 through 20B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
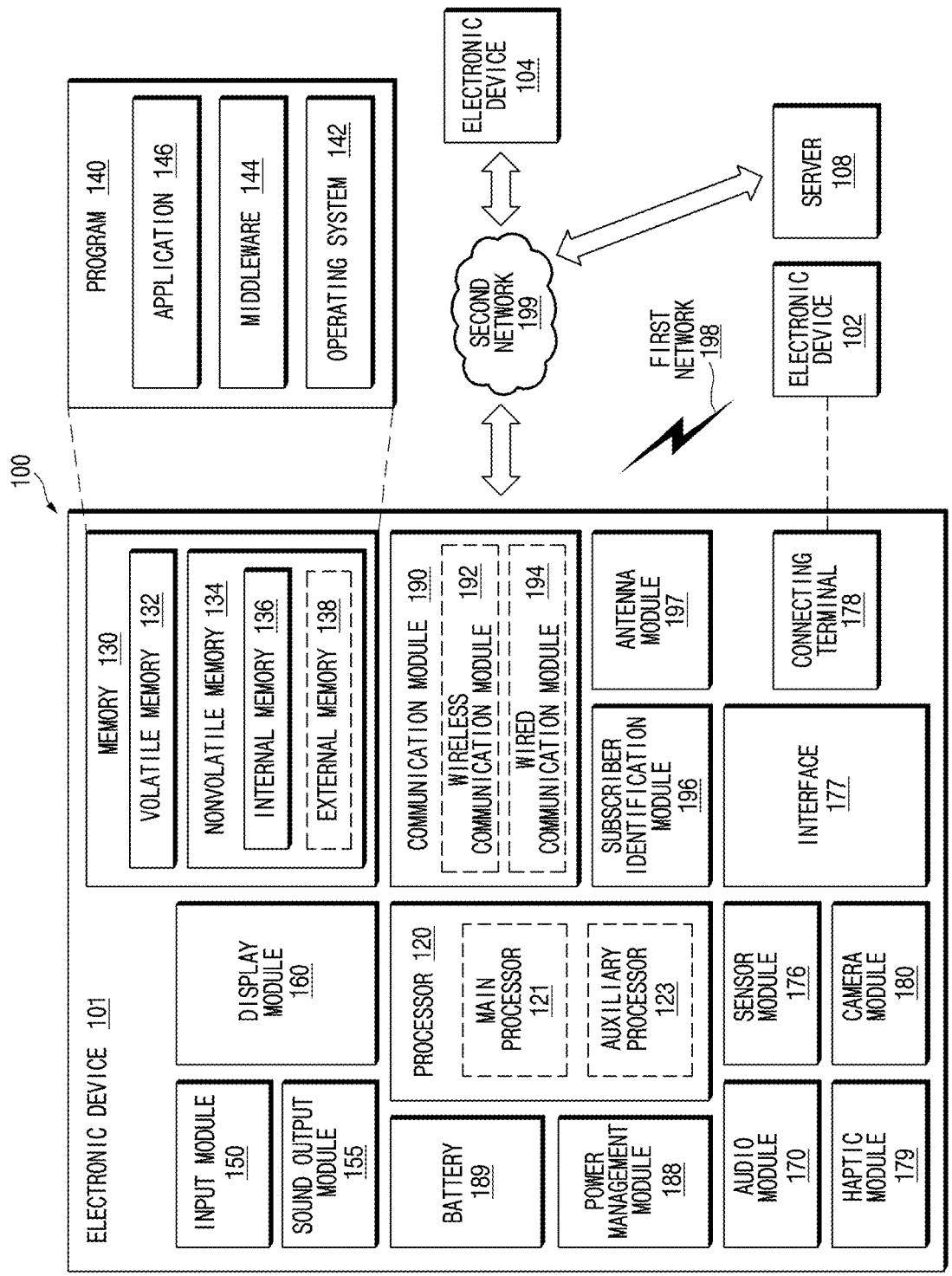
FIG. 1 is a block diagram of an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network).

According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
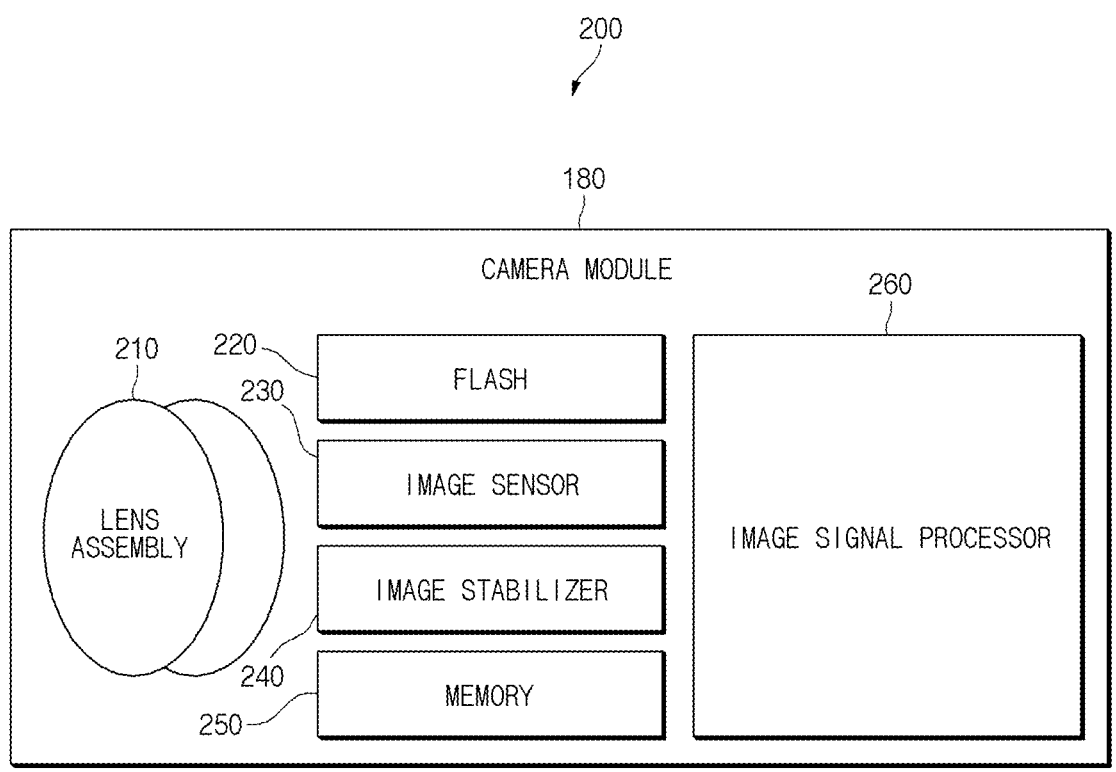
FIG. 2 is a block diagram illustrating a camera module according to various embodiments.

FIG. 2 is a block diagram 200 illustrating the camera module 180 according to various embodiments.

Referring to FIG. 2, the camera module 180 (e.g., a camera module 400 of FIGS. 3A to 3C or a camera module 400 of FIG. 4) may include a lens assembly 210 (e.g., a lens assembly 420 of FIGS. 4 to 6), a flash 220, an image sensor 230 (e.g., an image sensor 461 of FIG. 5), an image stabilizer 240, memory 250 (e.g., buffer memory), or an image signal processor 260. In an embodiment, at least one of components (e.g., the lens assembly 210, the flash 220, the image sensor 230, the image stabilizer 240, and the memory 250) included in the camera module 180 may be operated by control of control circuitry (e.g., the processor 120 of FIG. 1) of an electronic device (e.g., the electronic device 101 of FIG. 1). For example, the control circuitry (e.g., the processor 120 of FIG. 1) may include a main processor (e.g., the main processor 121 of FIG. 1) and/or an auxiliary processor (e.g., the auxiliary processor 123 of FIG. 1 or the image signal processor 260).

In an embodiment, the lens assembly 210 may collect light emitted from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

In an embodiment, the flash 220 may emit light that is used to reinforce light emitted or reflected from an object. According to an embodiment, the flash 220 may include one or more light emitting diodes (e.g., a red-green-blue (RGB) light-emitting diode (LED), a white LED, an infrared LED, or an ultraviolet LED) or a xenon lamp.

In an embodiment, the image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black and white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

In an embodiment, the image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

In an embodiment, the memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

In an embodiment, the image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180.

According to an embodiment, the image signal processor 260 may be configured as at least part (e.g., the auxiliary processor 123 of FIG. 1) of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. For example, the electronic device 101 may include a plurality of camera modules 180 including lenses (e.g., the lens assembly 210) having different view angles. Based on user selection, the electronic device 101 may perform control to use the view angle of a camera module 180 related to the user selection. For example, at least one of the plurality of camera modules 180 may form a wide-angle camera and at least another of the plurality of camera modules 180 may form a telephoto camera. Similarly, at least one of the plurality of camera modules 180 may form a front camera and at least another of the plurality of camera modules 180 may form a rear camera. Furthermore, the plurality of camera modules 180 may include at least one of a wide-angle camera, a telephoto camera, a color camera, a black and white camera, or an infrared (IR) camera (e.g., a time of flight (TOF) camera or a structured light camera). According to an embodiment, the IR camera may operate as at least part of a sensor module (e.g., the sensor module 176 of FIG. 1). For example, the TOF camera (e.g., a camera module 312 of FIG. 3B) may operate as at least part of a sensor module (e.g., the sensor module 176 of FIG. 1) for sensing the distance to an object.

Figure 3A:
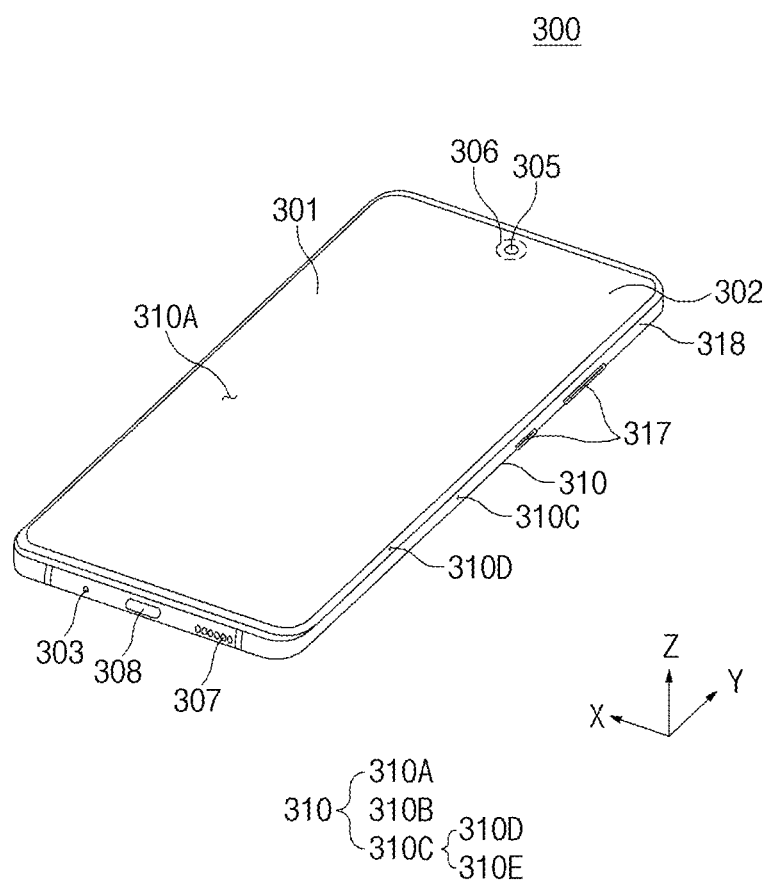
FIG. 3A illustrates a front perspective view of an electronic device according to an embodiment.
Figure 3B:
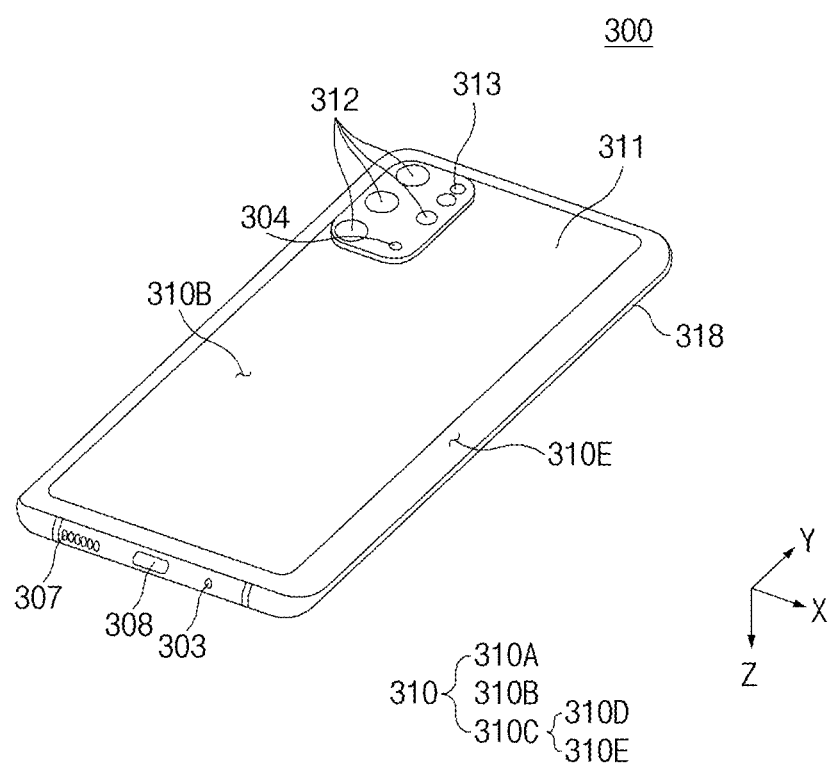
FIG. 3B illustrates a rear perspective view of the electronic device according to an embodiment.
Figure 3C:
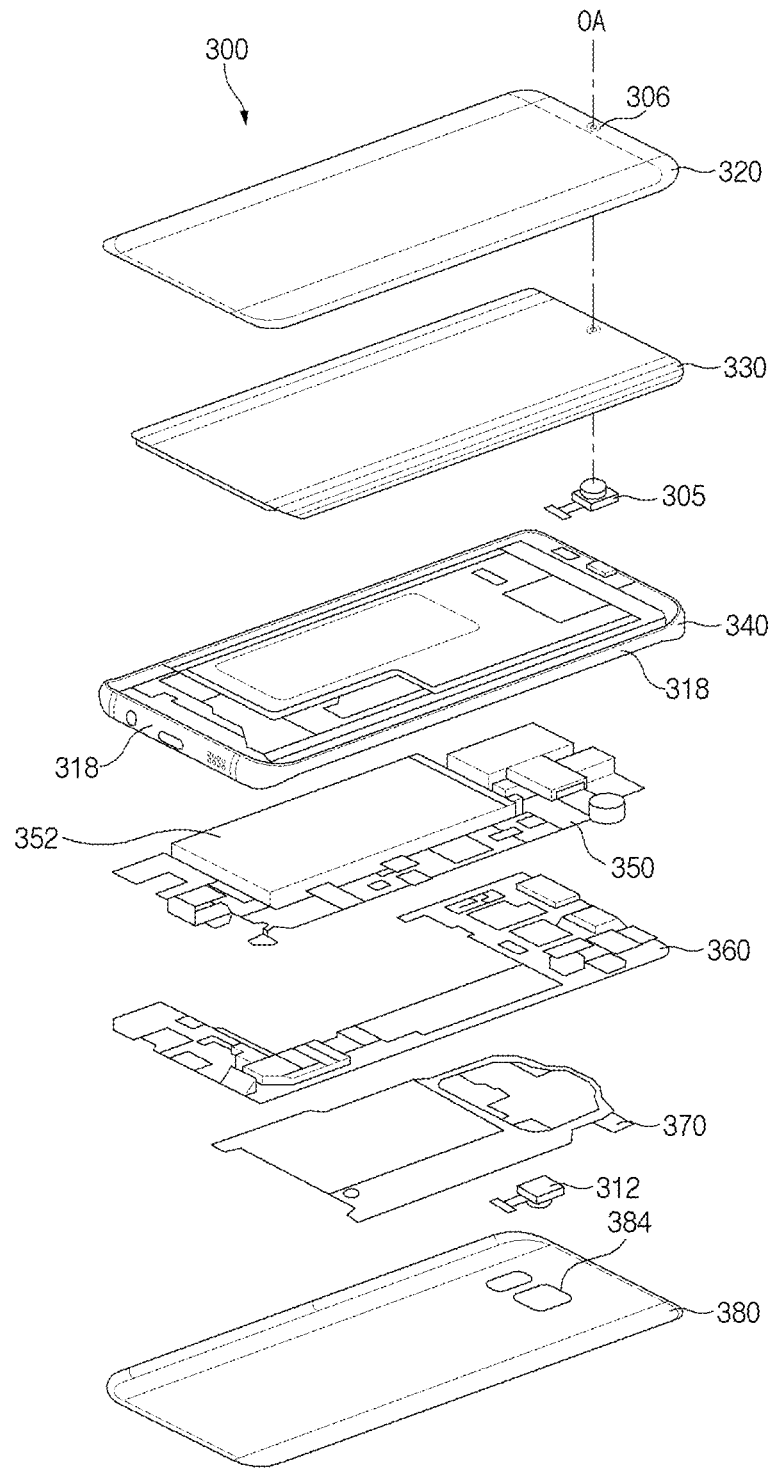
FIG. 3C illustrates an exploded perspective view of the electronic device according to an embodiment.

FIG. 3A illustrates a front perspective view of an electronic device 300 according to an embodiment. FIG. 3B illustrates a rear perspective view of the electronic device 300 according to an embodiment. FIG. 3C illustrates an exploded perspective view of the electronic device 300 according to an embodiment.

Referring to FIGS. 3A and 3B, the electronic device 300 may include a housing 310 that includes a first surface (or, a front surface) 310A, a second surface (or, a rear surface) 310B, and a side surface 310C surrounding a space between the first surface 310A and the second surface 310B.

In another embodiment (not illustrated), the housing 310 may refer to a structure that forms some of the first surface 310A, the second surface 310B, and the side surface 310C.

In an embodiment, the first surface 310A may be formed by a front plate 302 (e.g., a front plate 320 of FIG. 3C), at least a portion of which is substantially transparent. The front plate 302 may include a glass plate including various coating layers or a polymer plate. In an embodiment, the second surface 310B may be formed by a back plate 311 (e.g., a back plate 380 of FIG. 3C) that is substantially opaque. The back plate 311 may be formed of, for example, coated or colored glass, ceramic, polymer, metal (e.g., aluminum, stainless steel (STS), or magnesium), or a combination of at least two of the aforementioned materials. The side surface 310C may be formed by a side bezel structure 318 that is coupled with the front plate 302 and the back plate 311 and that contains metal and/or polymer.

In another embodiment, the back plate 311 and the side bezel structure 318 may be integrally formed with each other and may contain the same material (e.g., a metallic material such as aluminum).

In the illustrated embodiment, the front plate 302 may include two first areas 310D that curvedly and seamlessly extend from partial areas of the first surface 310A toward the back plate 311. The first areas 310D may be located at opposite long edges of the front plate 302.

In the illustrated embodiment, the back plate 311 may include two second areas 310E that curvedly and seamlessly extend from partial areas of the second surface 310B toward the front plate 302. The second areas 310E may be located at opposite long edges of the back plate 311.

In another embodiment, the front plate 302 (or, the back plate 311) may include one of the first areas 310D (or, the second areas 310E). Furthermore, in another embodiment, the front plate 302 (or, the back plate 311) may not include a part of the first areas 310D (or, the second areas 310E).

In an embodiment, when viewed from a side of the electronic device 300, the side bezel structure 318 may have a first thickness (or, width) at sides (e.g., short sides) not including the first areas 310D or the second areas 310E and may have a second thickness at sides (e.g., long sides) including the first areas 310D or the second areas 310E, the second thickness being smaller than the first thickness.

In an embodiment, the electronic device 300 may include at least one of a display 301 (e.g., the display module 160 of FIG. 1), various audio modules (e.g., the audio module 170 of FIG. 1) such as speakers within the speaker hole 307 and microphones within microphone holes 304 and 304, a sensor module (not illustrated) (e.g., the sensor module 176 of FIG. 1), camera modules 305 and 312 (e.g., the camera module 180 of FIG. 1 or the camera module 400 of FIG. 4), key input devices 317 (e.g., the input module 150 of FIG. 1), a light emitting element (not illustrated), or a connector hole 308 (e.g., the connecting terminal 178 of FIG. 1). In another embodiment, at least one component (e.g., the key input devices 317 or the light emitting element (not illustrated)) among the aforementioned components may be omitted from the electronic device 300, or other component(s) may be additionally included in the electronic device 300.

In an embodiment, the display 301 may be visually exposed through at least a portion of the front plate 302. For example, at least a portion of the display 301 may be visually exposed through the front plate 302 that includes the first surface 310A and the first areas 310D of the side surface 310C.

In an embodiment, the shape of the display 301 may be formed to be substantially the same as the shape of the adjacent outside edge of the front plate 302. In another embodiment (not illustrated), to expand the area by which the display 301 is visually exposed, the gap between the outside edge of the display 301 and the outside edge of the front plate 302 may be substantially constant.

In an embodiment, a surface of the housing 310 (or, the front plate 302) may include a display area through which the display 301 is visually exposed and on which contents are displayed through pixels. For example, the display area may include the first surface 310A and the first areas 310D of the side surface.

In another embodiment (not illustrated), the display area 310A and 310D may include a sensing area (not illustrated) that is configured to obtain biometric information of a user. When the display area 310A and 310D includes the sensing area, this may mean that at least a portion of the sensing area overlaps the display area 310A and 310D. For example, the sensing area (not illustrated) may refer to an area capable of displaying contents by the display 301 like the other areas of the display area 310A and 310D and additionally obtaining biometric information (e.g., a fingerprint) of the user.

In an embodiment, the display area 310A and 310D of the display 301 may include a camera area 306. For example, the camera area 306 may be an area through which light reflected from an object and received to the first camera module 305 passes. For example, the camera area 306 may include an area through which the optical axis of the first camera module 305 (e.g., an optical axis OA of FIG. 4) passes. When the display area 310A and 310D includes the camera area 306, this may mean that at least a portion of the camera area 306 overlaps the display area 310A and 310D. For example, likewise to the other areas of the display area 310A and 310D, the camera area 306 may display contents by the display 301.

In various embodiments (not illustrated), the screen display area 310A and 310D of the display 301 may include an area through which the first camera module 305 (e.g., a punch hole camera) is visually exposed. For example, at least a portion of the periphery of the area through which the first camera module 305 is exposed may be surrounded by the screen display area 310A and 310D. In an embodiment, the first camera module 305 may include a plurality of camera modules (e.g., the camera module 180 of FIG. 1 and the camera module 400 of FIG. 4).

In an embodiment, the display 301 may include, on the rear surface of the screen display area 310A and 310D, at least one of the audio modules (such as speakers within the speaker hole 307 and a microphone within microphone holes 304 and 304), the sensor module (not illustrated), a camera module (e.g., the first camera module 305), or the light emitting element (not illustrated). For example, the electronic device 300 may include a camera module (e.g., the first camera module 305) disposed on the rear side (e.g., the side facing the −Z-axis direction) of the first surface 310A (e.g., the front surface) and/or the side surface 310C (e.g., at least one surface of the first areas 310D) to face toward the first surface 310A and/or the side surface 310C. For example, the first camera module 305 may include an under display camera (UDC) that is hidden without being visually exposed on the screen display area 310A and 310D.

In another embodiment (not illustrated), the display 301 may include, or may be disposed adjacent to, touch detection circuitry, a pressure sensor for measuring the intensity (pressure) of a touch, and/or a digitizer for detecting a stylus pen of a magnetic field type.

In an embodiment, various audio modules may include the microphone holes 303 and 304 and the speaker hole 307.

In an embodiment, the microphone holes 303 and 304 may include the first microphone hole 303 formed in a partial area of the side surface 310C and the microphone hole 304 formed in a partial area of the second surface 310B. Microphones for obtaining external sounds may be disposed in the housing 310 to correspond to the microphone holes 303 and 304. The microphones may each include a plurality of microphones to detect the direction of a sound. In an embodiment, the second microphone hole 304 formed in the partial area of the second surface 310B may be disposed adjacent to the camera modules 305 and 312. For example, the second microphone hole 304 may obtain sounds when the camera modules 305 and 312 are executed, or may obtain sounds when other functions are executed.

In an embodiment, the speaker hole 307 may include a receiver hole for telephone call (not illustrated). The speaker hole 307 may be formed in a portion of the side surface 310C of the electronic device 300. In another embodiment, the speaker hole 307, together with the microphone hole 303, may be implemented as a single hole. Although not illustrated, the receiver hole for telephone call (not illustrated) may be formed in another portion of the side surface 310C. For example, the receiver hole for telephone call (not illustrated) may be formed in another portion (e.g., a portion facing the +Y-axis direction) of the side surface 310C that faces the portion (e.g., a portion facing the −Y-axis direction) of the side surface 310C in which the speaker hole 307 is formed.

In an embodiment, the electronic device 300 may include a speaker fluidly connected with the speaker hole 307. In another embodiment, the speaker may include a piezoelectric speaker that does not include the speaker hole 307.

In an embodiment, the sensor module (not illustrated) (e.g., the sensor module 176 of FIG. 1) may generate an electrical signal or a data value that corresponds to an operational state inside the electronic device 300 or an environmental state external to the electronic device 300. In an embodiment, the sensor module (not illustrated) may be disposed on at least a part of the first surface 310A, the second surface 310B, and the side surface 310C (e.g., the first areas 310D and/or the second areas 310E) of the housing 310 and may be disposed on the rear surface of the display 301 (e.g., a fingerprint sensor). For example, at least a portion of the sensor module (not illustrated) may be disposed under the display area 310A and 310D and may not be visually exposed, and the sensing area (not illustrated) may be formed in at least a portion of the display area 310A and 310D. For example, the sensor module (not illustrated) may include an optical fingerprint sensor. In some embodiments (not illustrated), the fingerprint sensor may be disposed on the second surface 310B as well as the first surface 310A of the housing 310 (e.g., the screen display area 310A and 310D). For example, the sensor module may include at least one of a proximity sensor, a heart rate monitor (HRM) sensor, a fingerprint sensor, a gesture sensor, a gyro sensor, an atmospheric pressure sensor, a magnetic sensor, an acceleration sensor, a grip sensor, a color sensor, an infrared (IR) sensor, a biosensor, a temperature sensor, a humidity sensor, or an illuminance sensor.

In an embodiment, the key input devices 317 may be disposed on the side surface 310C of the housing 310 (e.g., the first areas 310D and/or the second areas 310E). In another embodiment, the electronic device 300 may not include all or some of the key input devices 317, and the key input devices 317 not included may be implemented in a different form, such as a soft key, on the display 301. In another embodiment, the key input devices may include a sensor module (not illustrated) that forms the sensing area (not illustrated) that is included in the display area 310A and 310D.

In an embodiment, the connector hole 308 may accommodate a connector. The connector hole 308 may be disposed in the side surface 310C of the housing 310. For example, the connector hole 308 may be disposed in the side surface 310C so as to be adjacent to at least a part of the audio modules (e.g., the microphone hole 303 and the speaker hole 307). In another embodiment, the electronic device 300 may include the first connector hole 308 capable of accommodating a connector (e.g., a USB connector) for transmitting/receiving power and/or data with an external electronic device, and/or a second connector hole (not illustrated) capable of accommodating a connector (e.g., an earphone jack) for transmitting/receiving audio signals with an external electronic device.

In an embodiment, the electronic device 300 may include the light emitting element (not illustrated). For example, the light emitting element (not illustrated) may be disposed on the first surface 310A of the housing 310. The light emitting element (not illustrated) may provide state information of the electronic device 300 in the form of light. In another embodiment, the light emitting element (not illustrated) may provide a light source that operates in conjunction with operation of the first camera module 305. For example, the light emitting element (not illustrated) may include an LED, an IR LED, and/or a xenon lamp.

In an embodiment, the camera modules 305 and 312 (e.g., the camera module 180 of FIG. 1 and the camera module 400 of FIG. 4) may include the first camera module 305 (e.g., an under display camera) configured to receive light through the camera area 306 in the first surface 310A of the electronic device 300, the second camera module 312 configured to receive light through a partial area of the second surface 310B (e.g., a rear camera area 384 of FIG. 3C), and/or a flash 313.

In an embodiment, the first camera module 305 may include an under display camera (UDC) disposed on the rear surface of the display 301. For example, the first camera module 305 may be located in some layers of the display 301, or may be located such that an optical axis of a lens (e.g., the optical axis OA of FIG. 4) passes through the display area 310A and 310D of the display. In various embodiments, the first camera module 305 may be configured to receive light through the camera area 306 included in the display area 310A and 310D. For example, the camera area 306 may be configured to display contents like the other areas of the display area 310A and 310D when the first camera module 305 does not operate. For example, when the first camera module 305 operates, the camera area 306 may not display contents, and the first camera module 305 may receive light through the camera area 306.

In various embodiments (not illustrated), the first camera module 305 (e.g., a punch hole camera) may be exposed through a portion of the display area 310A and 310D of the display 301. For example, the first camera module 305 may be exposed on a partial area of the screen display area 310A and 310D through an opening formed in a portion of the display 301.

In an embodiment, the second camera module 312 may include a plurality of camera modules (e.g., a dual camera, a triple camera, or a quad camera). However, the second camera module 312 is not necessarily limited to including the plurality of camera modules and may include one camera module.

In an embodiment, the first camera module 305 and/or the second camera module 312 may include one or more lenses, an image sensor (e.g., the image sensor 230 of FIG. 2), and/or an image signal processor (e.g., the image signal processor 260 of FIG. 2). The flash 313 may include, for example, a light emitting diode or a xenon lamp. In another embodiment, two or more lenses (an infrared camera lens, a wide angle lens, and a telephoto lens) and image sensors may be disposed in the housing to face toward one surface (e.g., the second surface 310B) of the electronic device 300.

Referring to FIG. 3C, the electronic device 300 may include the side bezel structure 318, a first support member 340 (e.g., a bracket), the front plate 320 (e.g., the front plate 302 of FIG. 3A), a display 330 (e.g., the display 301 of FIG. 3A), a printed circuit board 350 (e.g., a printed circuit board (PCB), a flexible PCB (FPCB), or a rigid-flexible PCB (RFPCB)), a battery 352, a second support member 360 (e.g., a rear case), an antenna 370, and the back plate 380 (e.g., the back plate 311 of FIG. 3B). In some embodiments, at least one component (e.g., the first support member 340 or the second support member 360) among the aforementioned components may be omitted from the electronic device 300, or other component(s) may be additionally included in the electronic device 300. At least one of the components of the electronic device 300 may be identical or similar to at least one of the components of the electronic device 300 of FIG. 3A or 3B, and repetitive descriptions will hereinafter be omitted.

In an embodiment, the first support member 340 may be disposed inside the electronic device 300 and may be connected with the side bezel structure 318, or may be integrally formed with the side bezel structure 318. The first support member 340 may be formed of, for example, a metallic material and/or a nonmetallic (e.g., polymer) material. The display 330 may be coupled to, or located on, one surface of the first support member 340, and the printed circuit board 350 may be coupled to, or located on, an opposite surface of the first support member 340.

In an embodiment, a processor, a memory, and/or an interface may be disposed on the printed circuit board 350. The processor may include, for example, one or more of a central processing unit, an application processor, a graphic processing unit, an image signal processor, a sensor hub processor, or a communication processor.

In an embodiment, the memory may include, for example, volatile memory or nonvolatile memory.

In an embodiment, the interface may include, for example, a high definition multimedia interface (HDMI), a universal serial bus (USB) interface, an SD card interface, and/or an audio interface. For example, the interface may electrically or physically connect the electronic device 300 with an external electronic device and may include a USB connector, an SD card/MMC connector, or an audio connector.

In an embodiment, the battery 352 may supply power to at least one component of the electronic device 300. The battery 152 may include, for example, a primary cell that is not rechargeable, a secondary cell that is rechargeable, or a fuel cell. At least a portion of the battery 352, for example, may be disposed on substantially the same plane as the printed circuit board 350. The battery 352 may be integrally disposed inside the electronic device 300, or may be disposed so as to be detachable from the electronic device 300.

In an embodiment, the antenna 370 may be disposed between the back plate 380 and the battery 352. The antenna 370 may include, for example, a near field communication (NFC) antenna, a wireless charging antenna, and/or a magnetic secure transmission (MST) antenna. For example, the antenna 370 may perform short-range communication with an external device, or may wirelessly transmit and receive power for charging. In another embodiment, an antenna structure may be formed by a portion of the side bezel structure 318 and/or a portion of the first support member 340, or a combination thereof.

In an embodiment, the first camera module 305 may be coupled to the rear surface of the display 330 to receive light through the camera area 306 of the front plate 320. For example, at least a portion of the first camera module 305 may be disposed on the first support member 340. For example, an image sensor of the first camera module 305 (e.g., the image sensor 230 of FIG. 2 or the image sensor 461 of FIG. 5) may receive light passing through the camera area 306 and a pixel array included in the display 330. For example, the camera area 306 may at least partially overlap the display area on which contents are displayed. For example, the optical axis OA of the first camera module 305 may pass through a partial area of the display 330 and the camera area 306 of the front plate 320. For example, the partial area may include a pixel array including a plurality of light emitting elements. In an embodiment, a partial area of the display 330 that faces the first camera module 305 may be formed to be a transmissive area having a specified transmittance as a portion of the display area where contents are displayed. In an embodiment, the transmissive area may be formed to have a transmittance of about 5% to about 25%. In an embodiment, the transmissive area may be formed to have a transmittance of about 25% to about 50%. In an embodiment, the transmissive area may be formed to have a transmittance of about 50% or more. The transmissive area may include an area through which light for generating an image by being focused on an image sensor (e.g., the image sensor 230 of FIG. 2 or the image sensor 461 of FIG. 5) passes and that overlaps an effective area (e.g., a field of view (FOV)) of the first camera module 305. For example, the transmissive area of the display 330 may include an area having a lower pixel density and/or wiring density than a surrounding area.

In an embodiment, the second camera module 312 may be disposed such that a lens is exposed through the rear camera area 384 of the back plate 380 (e.g., the second surface 310B of FIG. 2) of the electronic device 300. The rear camera area 384 may be formed in at least a portion of a surface (e.g., the second surface 310B of FIG. 2) of the back plate 380. In an embodiment, the rear camera area 384 may be formed to be at least partially transparent such that the second camera module 312 receives external light through the rear camera area 384.

In an embodiment, at least a portion of the rear camera area 384 may protrude to a predetermined height from the surface of the back plate 380. However, without being necessarily limited thereto, the rear camera area 384 may form substantially the same plane as the surface of the back plate 380.

Figure 4:
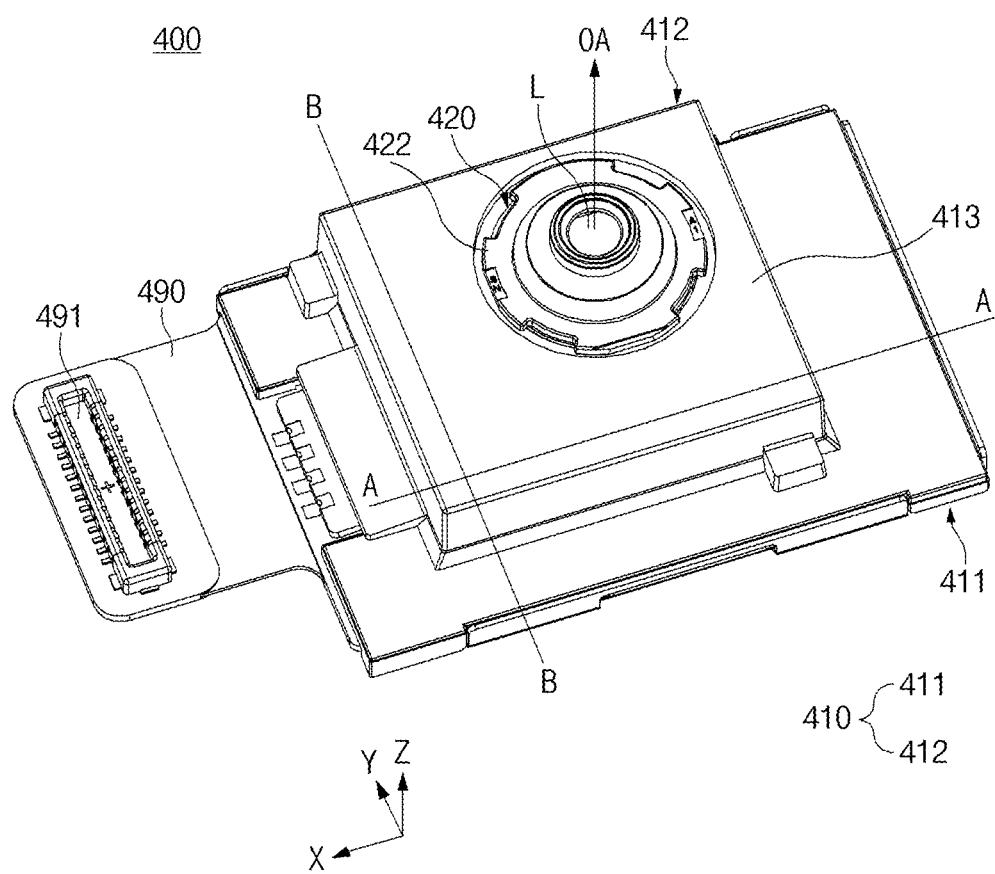
FIG. 4 illustrates a perspective view of a camera module according to an embodiment.

FIG. 4 illustrates a perspective view of a camera module according to an embodiment.

Referring to FIG. 4, the camera module 400 may include a cover 412, a base 411, a fixed substrate 490, and a lens assembly 420.

In an embodiment, the cover 412 and the base 411 may form a camera housing 410. The cover 412 may include a lens holder 413 surrounding the lens assembly 420. For example, the lens holder 413 of the cover 412 may have an opening formed therein in which at least a portion of the lens assembly 420 is accommodated.

In an embodiment, the fixed substrate 490 may be located adjacent to the cover 412 and the base 411. For example, the fixed substrate 490 may be located on substantially the same plane as the base 411. The fixed substrate 490 may include a first connector 491 coupled to a printed circuit board (e.g., the printed circuit board 350 of FIG. 3C) of the electronic device 300. The fixed substrate 490 may be electrically connected with a coil and an image sensor (e.g., the image sensor 230 of FIG. 2 or the image sensor 461 of FIG. 5) that are included in the camera module 400. The fixed substrate 490 may be configured to transmit a drive signal of the coil and an image-related electrical signal generated by the image sensor to the printed circuit board 350 of the electronic device 300.

In an embodiment, the lens assembly 420 may include at least one lens L and a lens barrel 422 surrounding the at least one lens L. The lens barrel 422 may be configured to protect the lens L from an external impact. The lens assembly 420 may be mounted in the lens holder 413 of the cover 412. In an embodiment, the lens L may condense external light incident through the opening of the cover 412.

Figure 5:
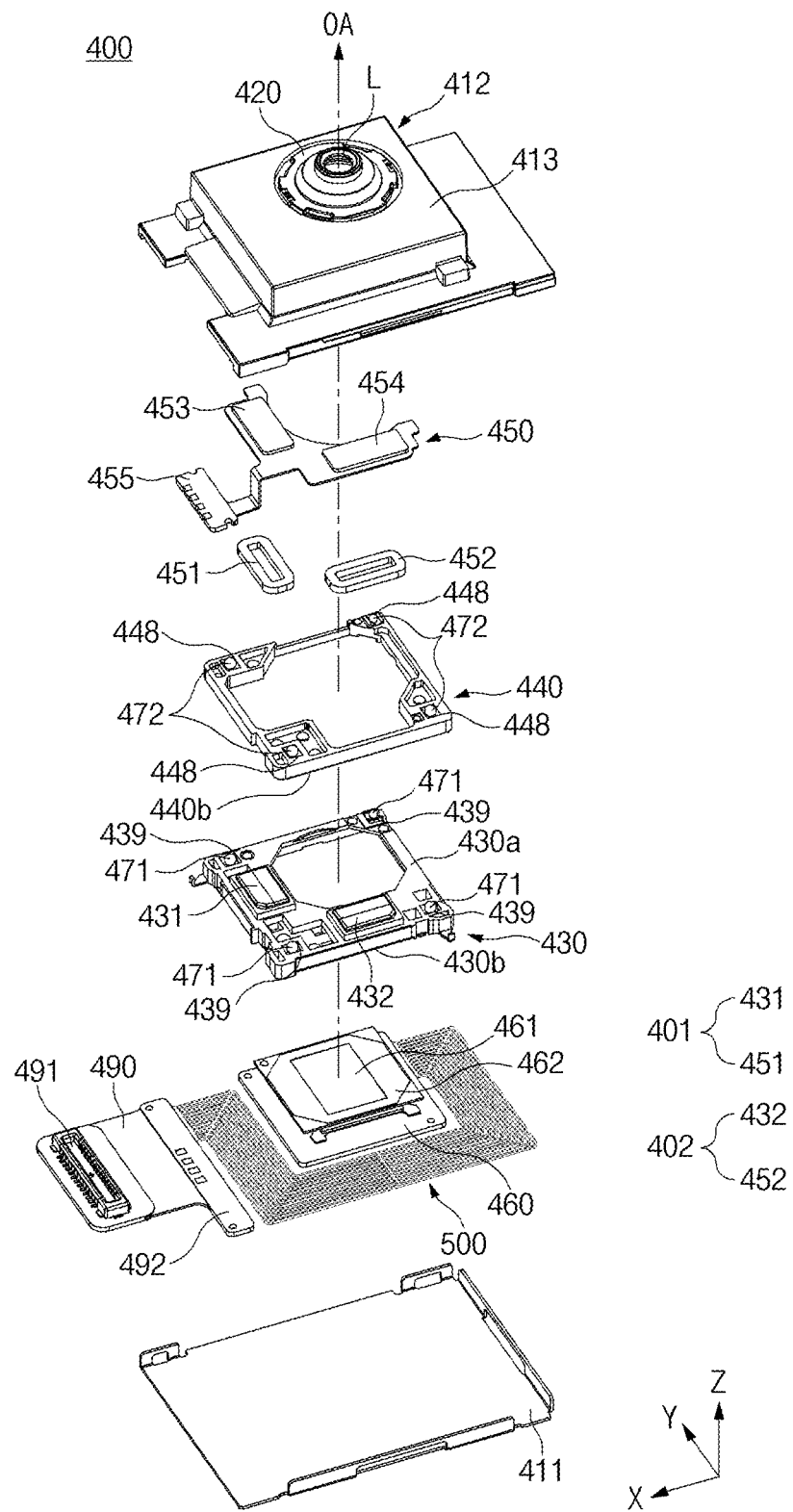
FIG. 5 illustrates an exploded perspective view of the camera module according to an embodiment.
Figure 6:
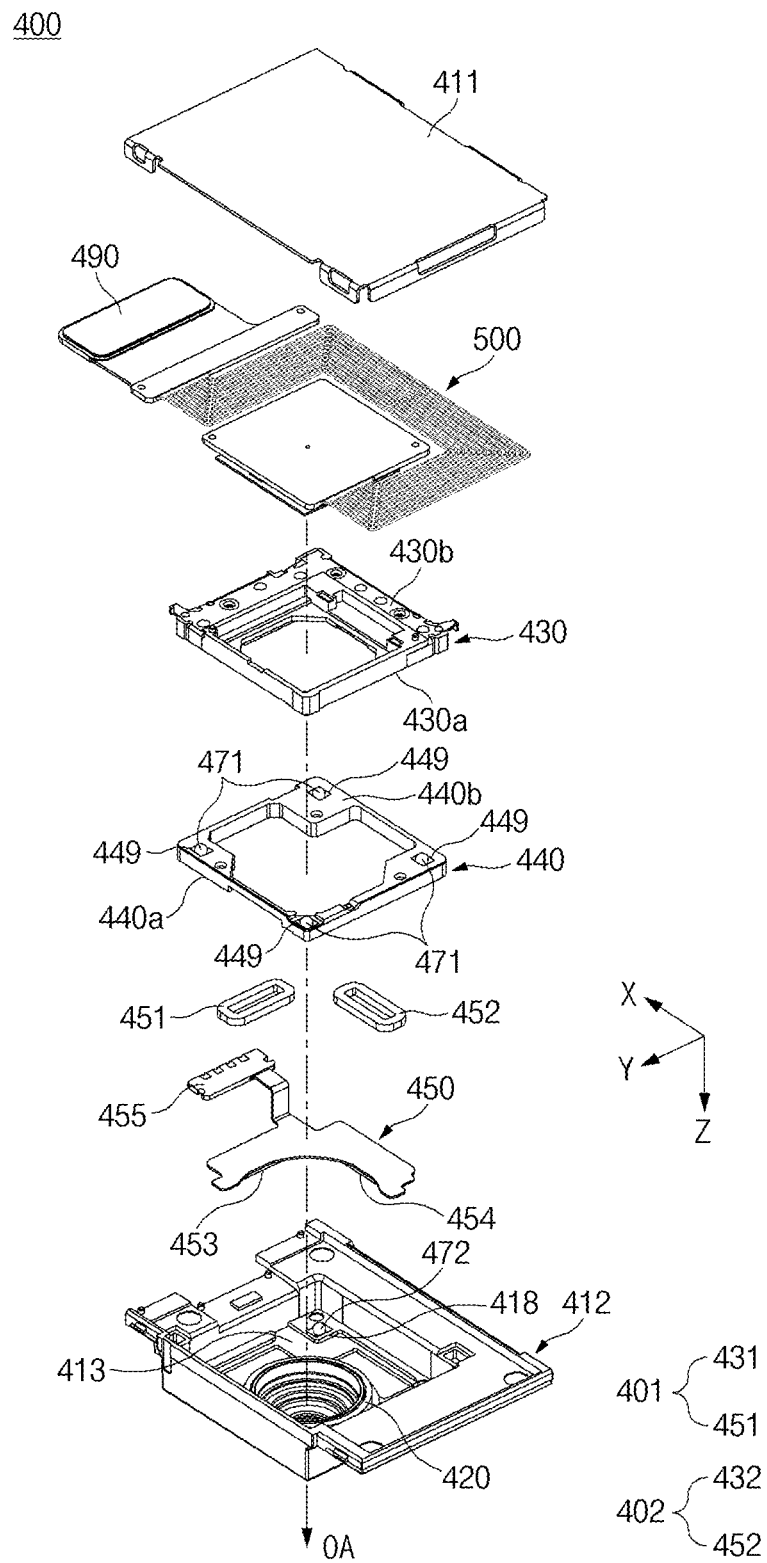
FIG. 6 illustrates an exploded perspective view of the camera module according to an embodiment.

FIG. 5 illustrates an exploded perspective view of the camera module according to an embodiment. FIG. 6 illustrates an exploded perspective view of the camera module according to an embodiment.

In an embodiment, the camera module 400 may include the cover 412, the base 411, the lens assembly 420, the fixed substrate 490, a sensor carrier 430, a middle guide 440, a circuit board 460, a connecting member 500, a second circuit board 450, a first ball 471, a second ball 472, a first drive member 401, and a second drive member 402.

In an embodiment, the cover 412 and the base 411 may form an inner space. The sensor carrier 430, the middle guide 440, the first ball 471, the second ball 472, the first drive member 401, and the second drive member 402 may be disposed in the inner space.

In an embodiment, the camera module 400 may be configured to perform an image stabilization function of moving the image sensor 461 in at least one direction substantially perpendicular to the optical axis OA in response to disturbances. In an embodiment, the camera module 400 may include a moving part configured to move in relation to the image stabilization function and a fixed part fixed in a specified position independently of the image stabilization function. For example, referring to FIGS. 5 and 6, the fixed part may include the fixed substrate 490, the cover 412, the base 411, and the lens assembly 420. The moving part may include the sensor carrier 430 and the middle guide 440.

In an embodiment, the lens assembly 420 may be mounted in the lens holder 413 of the cover 412 and may be fixed in a specified position.

In an embodiment, the sensor carrier 430 may be disposed between the base 411 and the middle guide 440 when viewed in the direction of the optical axis OA. For example, the sensor carrier 430 may be disposed such that a first surface 430a faces a fourth surface 440b of the middle guide and a second surface 430b faces the base 411. For example, the first surface 430a may at least partially overlap the middle guide 440 when viewed in the direction of the optical axis OA. The second surface 430b may at least partially overlap the circuit board 460 when viewed in the direction of the optical axis OA.

In an embodiment, the sensor carrier 430 may be configured to move in the x-axis and y-axis directions. For example, the sensor carrier 430 may be configured to move in the x-axis direction relative to the middle guide 440 and may be configured to move in the x-axis and y-axis directions relative to the lens assembly 420. For example, when the sensor carrier 430 moves in the x-axis direction, the middle guide 440 may not move. For example, when the sensor carrier 430 moves in the y-axis direction, the middle guide 440 may move in the y-axis direction together with the sensor carrier 430.

In an embodiment, the sensor carrier 430 may include a first magnet 431, a second magnet 432, and the circuit board 460. For example, the first magnet 431, the second magnet 432, and the circuit board 460 may move in the x-axis and y-axis directions together with the sensor carrier 430.

In an embodiment, the circuit board 460 may be mounted on the sensor carrier 430 and may move together with the sensor carrier 430. In an embodiment, the image sensor 461 and an optical filter 462 covering the image sensor 461 may be disposed on the circuit board 460. For example, the optical filter 462 may include an infrared filter. In an embodiment, the circuit board 460 may be electrically connected to the fixed substrate 490 through the connecting member 500.

In an embodiment, the connecting member 500 may extend such that one side is connected to the circuit board 460 and an opposite side is connected to the fixed substrate 490. The connecting member 500 may extend along edges of the circuit board 460. For example, the connecting member 500 may extend along at least two edges of the circuit board 460 that are adjacent to each other. In an embodiment, the connecting member 500 may be configured to deform when the sensor carrier 430 and the circuit board 460 move in the x-axis direction and/or the y-axis direction. To this end, slits (e.g., second slits S2 of FIG. 11) extending in the x-axis direction and slits (e.g., first slits S1 of FIG. 11) extending in the y-axis direction may be formed on the connecting member 500.

In an embodiment, the connecting member 500 may include at least one conductive wire or at least one conductive pattern. In an embodiment, the connecting member 500 may be configured such that a slit is formed between one conductive wire (or, one conductive pattern) and another conductive wire (or, another conductive pattern).

In an embodiment, the image sensor 461 may be configured to receive light passing through the lens L and generate an electrical signal based on the received light signal. In an embodiment, the image sensor 461 may be disposed on the circuit board 460 so as to be at least partially aligned with the optical axis OA. For example, the center of the image sensor 461 and the optical axis OA may coincide with each other in a normal state in which the sensor carrier 430 does not move. For example, as an image stabilization function is performed, the sensor carrier 430 and the circuit board 460 may move, and the center of the image sensor 461 may be located in the x-axis direction and/or the y-axis direction from the optical axis OA.

In an embodiment, the middle guide 440 may be disposed between the sensor carrier 430 and the lens holder 413 of the cover 412 when viewed in the direction of the optical axis OA. For example, the middle guide 440 may be disposed such that the fourth surface 440*b* faces the first surface 430*a* of the sensor carrier 430 and a third surface 440*a* faces the lens holder 413. For example, the fourth surface 440*b* may at least partially overlap the sensor carrier 430, the circuit board 460, and the base 411 when viewed in the direction of the optical axis OA.

In an embodiment, the middle guide 440 may be configured to move in the x-axis direction. For example, the middle guide 440 may be configured to move in one of the directions in which the sensor carrier 430 is movable. For example, the middle guide 440 may move in the y-axis direction together with the sensor carrier 430. When the sensor carrier 430 moves in the x-axis direction, the middle guide 440 may not move in the x-axis direction. In an embodiment, the middle guide 440 may move relative to the fixed lens holder 413. For example, the middle guide 440 may move in the y-axis direction relative to the fixed lens holder 413.

In an embodiment, the second circuit board 450 may be disposed in the lens holder 413 of the cover 412 and may extend outside the cover 412. The second circuit board 450 may include a corresponding connector 455 coupled to a second connector 492 of the fixed substrate 490. The second circuit board 450 may be provided to be at least partially flexible. A first coil 451 and a second coil 452 may be disposed on the second circuit board 450. The second circuit board 450 may be configured to transmit drive signals of the first coil 451 and the second coil 452. The second circuit board 450 may be a fixed part that does not move when an image stabilization function is performed.

In an embodiment, the first drive member 401 may be configured to move (drive) the sensor carrier 430 in the x-axis direction. The first drive member 401 may include the first magnet 431, the first coil 451, and a first yoke 453. The first magnet 431 and the first coil 451 may be disposed to at least partially overlap each other in the direction of the optical axis. The first magnet 431 and the first coil 451 may provide a driving force acting in the x-axis direction when an electric current is applied to the first coil 451. The driving force may be referred to as the Lorentz force.

In an embodiment, the first magnet 431 may be disposed on the sensor carrier 430. The first magnet 431 may be fixedly disposed on the sensor carrier 430 and may move in the x-axis and y-axis directions together with the sensor carrier 430. For example, the first magnet 431 may be disposed in the +x-axis direction with respect to the sensor carrier 430. The first magnet 431 may be configured such that a surface facing the first coil 451 includes an N pole and an S pole. In an embodiment, the first magnet 431 may be configured such that the N pole and the S pole are arranged in the x-axis direction.

In an embodiment, the first coil 451 may be disposed on the second circuit board 450. The first coil 451 may be disposed in the +x-axis direction with respect to the lens assembly 420 to overlap the first magnet 431 in the direction of the optical axis OA. In an embodiment, the first coil 451 may be configured such that an electric current flows in a direction surrounding any axis parallel to the optical axis OA. For example, the first coil 451 may include a conductive wire or a conductive pattern that surrounds any axis parallel to the optical axis OA. In an embodiment, the first coil 451 may be disposed such that a first portion overlaps the N pole of the first magnet 431 and a second portion overlaps the S pole of the first magnet 431. For example, an electric current may flow in the first portion and the second portion in opposite directions.

In an embodiment, the first yoke 453 may be disposed between the second circuit board 450 and the lens holder 413 of the cover 412. In an embodiment, the first yoke 453 may at least partially overlap the first magnet 431 and the first coil 451 when viewed in the direction of the optical axis. For example, the first coil 451 and a portion of the second circuit board 450 may be disposed between the first yoke 453 and the first magnet 431. In an embodiment, the first yoke 453 may shield a magnetic field formed by the first coil 451. In an embodiment, the first yoke 453 may be configured to form an attractive force with the first magnet 431. Accordingly, an attractive force may act on the sensor carrier 430 on which the first magnet 431 is disposed and the lens holder 413 of the cover 412 on which the first yoke 453 is disposed. Due to the attractive force, the first ball 471 and the second ball 472 may not run idle when the sensor carrier 430 and/or the middle guide 440 moves.

In an embodiment, the second drive member 402 may be configured to move (drive) the sensor carrier 430 in the y-axis direction. The second drive member 402 may include the second magnet 432, the second coil 452, and a second yoke 454. The second magnet 432 and the second coil 452 may be disposed to at least partially overlap each other in the direction of the optical axis. The second magnet 432 and the second coil 452 may provide a driving force acting in the y-axis direction when an electric current is applied to the second coil 452. The driving force may be referred to as the Lorentz force.

In an embodiment, the second magnet 432 may be disposed on the sensor carrier 430. The second magnet 432 may be fixedly disposed on the sensor carrier 430 and may move in the x-axis and y-axis directions together with the sensor carrier 430. For example, the second magnet 432 may be disposed in the −y-axis direction with respect to the sensor carrier 430. The second magnet 432 may be configured such that a surface facing the second coil 452 includes an N pole and an S pole. In an embodiment, the second magnet 432 may be configured such that the N pole and the S pole are arranged in the y-axis direction.

In an embodiment, the second coil 452 may be disposed on the second circuit board 450. The second coil 452 may be disposed in the −y-axis direction with respect to the lens assembly 420 to overlap the second magnet 432 in the direction of the optical axis OA. In an embodiment, the second coil 452 may be configured such that an electric current flows in a direction surrounding any axis parallel to the optical axis OA. For example, the second coil 452 may include a conductive wire or a conductive pattern that surrounds any axis parallel to the optical axis OA. In an embodiment, the second coil 452 may be disposed such that a first portion overlaps the N pole of the second magnet 432 and a second portion overlaps the S pole of the second magnet 432. For example, an electric current may flow in the first portion and the second portion in opposite directions.

In an embodiment, the second yoke 454 may be disposed between the second circuit board 450 and the lens holder 413 of the cover 412. In an embodiment, the second yoke 454 may at least partially overlap the second magnet 432 and the second coil 452 when viewed in the direction of the optical axis OA. For example, the second coil 452 and a portion of the second circuit board 450 may be disposed between the second yoke 454 and the second magnet 432. In an embodiment, the second yoke 454 may shield a magnetic field formed by the second coil 452. In an embodiment, the second yoke 454 may be configured to form an attractive force with the second magnet 432. Accordingly, an attractive force may act on the sensor carrier 430 on which the second magnet 432 is disposed and the lens holder 413 of the cover 412 on which the second yoke 454 is disposed. Due to the attractive force, the first ball 471 and the second ball 472 may not run idle when the sensor carrier 430 and/or the middle guide 440 moves.

In an embodiment, the first ball 471 may be disposed between the sensor carrier 430 and the middle guide 440. In an embodiment, a plurality of first balls 471 may be provided to be disposed in the corners of the sensor carrier 430 and the middle guide 440. In an embodiment, the first balls 471 may provide a rolling frictional force between the sensor carrier 430 and the middle guide 440 when the sensor carrier 430 moves relative to the middle guide 440. In an embodiment, the first balls 471 may be partially accommodated in first recesses 439 that are formed on the sensor carrier 430 and that extend in the x-axis direction and second recesses 449 that are formed on the middle guide 440 and that extend in the x-axis direction. The first balls 471 may move in the x-axis direction while rolling in the state of being accommodated in the first recesses 439 and the second recesses 449.

In an embodiment, the second ball 472 may be disposed between the middle guide 440 and the lens holder 413 of the cover 412. In an embodiment, a plurality of second balls 472 may be provided to be disposed in the corners of the middle guide 440 and the lens holder 413. In an embodiment, the second balls 472 may provide a rolling frictional force between the middle guide 440 and the lens holder 413 when the middle guide 440 moves relative to the lens holder 413. In an embodiment, the second balls 472 may be partially accommodated in third recesses 448 that are formed on the middle guide 440 and that extend in the y-axis direction and fourth recesses 418 that are formed on the lens holder 413 and that extend in the y-axis direction. The second balls 472 may move in the y-axis direction while rolling in the state of being accommodated in the third recesses 448 and the fourth recesses 418.

In an embodiment, when the sensor carrier 430 moves in the x-axis direction, the middle guide 440 may not move in the x-axis direction. The first balls 471 may move while rotating in the x-axis direction between the moving sensor carrier 430 and the fixed middle guide 440. The second balls 472 may not rotate or move between the middle guide 440 and the lens holder 413 that are fixed.

In an embodiment, when the sensor carrier 430 moves in the y-axis direction, the middle guide 440 may move in the y-axis direction together with the sensor carrier 430. The first balls 471 may not rotate or move between the sensor carrier 430 and the middle guide 440 that move together. The second balls 472 may move while rotating in the y-axis direction between the fixed lens holder 413 and the moving middle guide 440.

In an embodiment, the camera module 400 may include the first balls 471 and the second balls 472 and may provide a rolling frictional force between structures having different degrees of freedom accordingly. Furthermore, the yokes 453 and 454 and the magnets 431 and 432 may provide an attractive force to the sensor carrier 430 and the lens holder 413 of the cover 412 such that the first balls 471 remain in contact with the middle guide 440 and the sensor carrier 430, and the second balls 472 remain in contact with the middle guide 440 and the lens holder 413.

Figure 7:
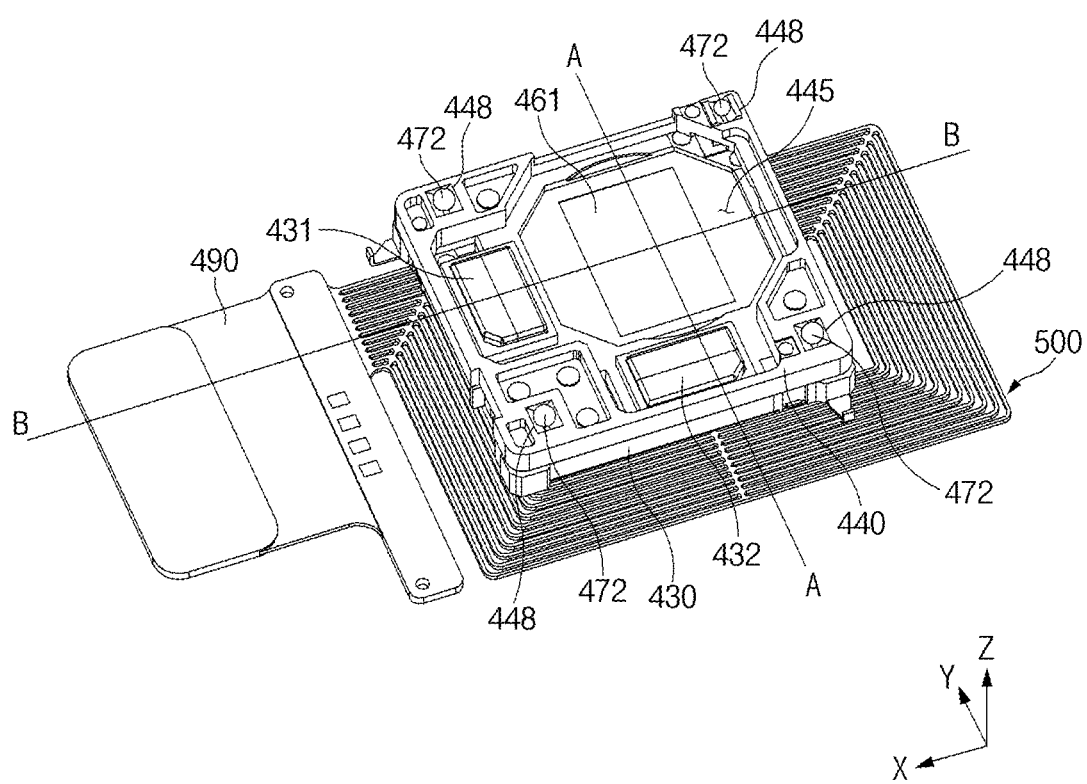
FIG. 7 illustrates a sensor carrier, a circuit board, and a middle guide of the camera module according to an embodiment.
Figure 8A:
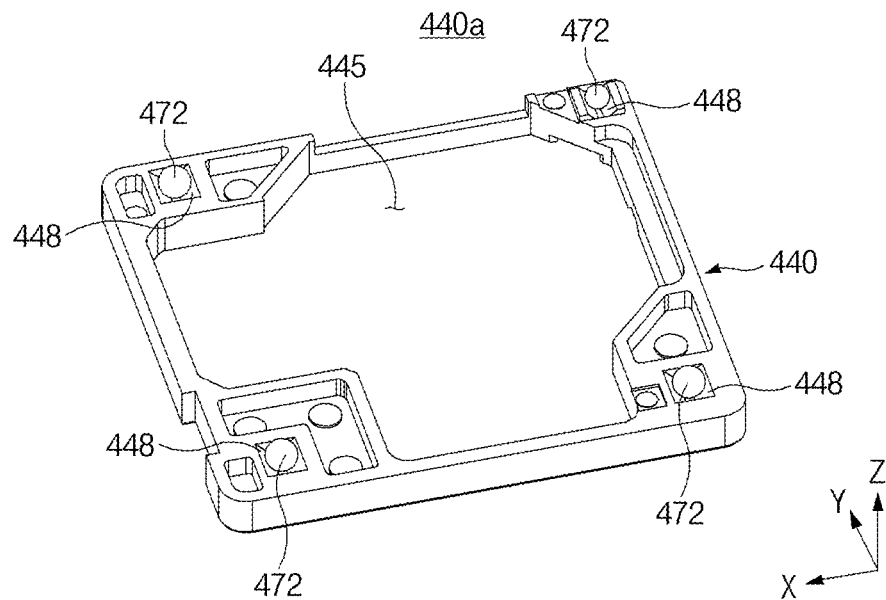
FIG. 8A illustrates the middle guide of the camera module according to an embodiment.
Figure 8B:
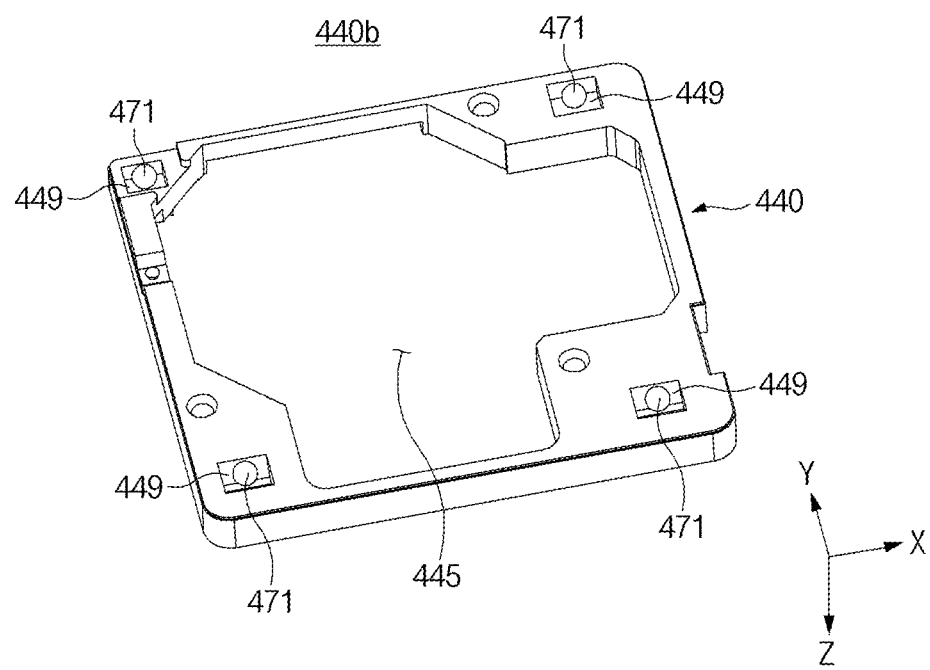
FIG. 8B illustrates the middle guide of the camera module according to an embodiment.

FIG. 7 illustrates the sensor carrier, the circuit board, and the middle guide of the camera module according to an embodiment. FIG. 8A illustrates the middle guide of the camera module according to an embodiment. FIG. 8B illustrates the middle guide of the camera module according to an embodiment.

Referring to FIG. 7, the middle guide 440 and the sensor carrier 430 may be coupled to at least partially overlap each other when viewed in the z-axis direction. For example, the middle guide 440 and the sensor carrier 430 may be coupled such that the image sensor 461 disposed in the sensor carrier 430 is exposed in the z-axis direction through an opening area 445 of the middle guide 440. In an embodiment, the middle guide 440 may be configured to be movable in the y-axis direction, and the sensor carrier 430 may be configured to be movable in the x-axis and the y-axis directions. For example, when the sensor carrier 430 moves in the y-axis direction, the middle guide 440 may move together with the sensor carrier 430.

In an embodiment, an image stabilization operation of the camera module 400 may include a first image stabilization operation in which the sensor carrier 430 moves in the x-axis direction relative to the middle guide 440 and the lens holder 413 and a second image stabilization operation in which the sensor carrier 430 and the middle guide 440 move in the y-axis direction relative to the lens holder 413.

In an embodiment, the camera module 400 may include a first ball guide structure for providing a rolling frictional force between the moving sensor carrier 430 and the relatively fixed middle guide 440 in the first image stabilization operation. Hereinafter, the first ball guide structure will be described with reference to FIGS. 5, 8B, and 10.

Referring to FIG. 5, the sensor carrier 430 may have the first recesses 439 in which the first balls 471 are at least partially accommodated. The first recesses 439 may be provided in a form extending in the x-axis direction. For example, the first recesses 439 may extend longer in the x-axis direction than in the y-axis direction. At least portions of the first balls 471 may be accommodated in the first recesses 439. The first balls 471 may partially make contact with the inner walls of the first recesses 439. For example, the first recesses 439 may be formed in a substantially V-shaped recess form when viewed in the y-z cross-section illustrated in FIG. 10. In an embodiment, referring to FIG. 8B, the first recesses 439 may be formed in positions corresponding to the second recesses 449 formed on the fourth surface 440b of the middle guide 440. The first recesses 439 may be formed in substantially the same shape as the second recesses 449. For example, the first recesses 439 may at least partially overlap the second recesses 449 when viewed in the direction of the optical axis OA. The first recesses 439, together with the second recesses 449, may form spaces in which the first balls 471 are accommodated.

Referring to FIG. 8B, in an embodiment, the middle guide 440 may have, on the fourth surface 440b thereof, the second recesses 449 in which the first balls 471 are at least partially accommodated. The second recesses 449 may be provided in a form extending in the x-axis direction. For example, the second recesses 449 may extend longer in the x-axis direction than in the y-axis direction. At least portions of the first balls 471 may be accommodated in the second recesses 449. The first balls 471 may partially make contact with the inner walls of the second recesses 449. For example, the second recesses 449 may be formed in a substantially V-shaped recess form when viewed in the y-z cross-section. In an embodiment, the second recesses 449 may be formed in positions corresponding to the first recesses 439 formed on the sensor carrier 430. The second recesses 449 may be formed in substantially the same shape as the first recesses 439. For example, the second recesses 449 may at least partially overlap the first recesses 439 when viewed in the direction of the optical axis. The second recesses 449, together with the first recesses 439, may form the spaces in which the first balls 471 are accommodated.

In an embodiment, the camera module 400 may include a second ball guide structure for providing a rolling frictional force between the moving middle guide 440 and the fixed lens holder 413 in the second image stabilization operation. Hereinafter, the second ball guide structure will be described with reference to FIGS. 6, 7, 8A, and 9.

Referring to FIGS. 7 and 8A, in an embodiment, the middle guide 440 may have, on the third surface 440a thereof, the third recesses 448 in which the second balls 472 are at least partially accommodated. The third recesses 448 may be provided in a form extending in the y-axis direction. For example, the third recesses 448 may extend longer in the y-axis direction than in the x-axis direction. At least portions of the second balls 472 may be accommodated in the third recesses 448. The second balls 472 may partially make contact with the inner walls of the third recesses 448. For example, the third recesses 448 may be formed in a substantially V-shaped recess form when viewed in the x-z cross-section illustrated in FIG. 9. In an embodiment, the third recesses 448 may be formed in positions corresponding to the fourth recesses 418 formed on the lens holder 413 of the cover 412. The third recesses 448 may be formed in substantially the same shape as the fourth recesses 418. For example, the third recesses 448 may at least partially overlap the fourth recesses 418 when viewed in the direction of the optical axis. The third recesses 448, together with the fourth recesses 418, may form spaces in which the second balls 472 are accommodated.

Figure 9:
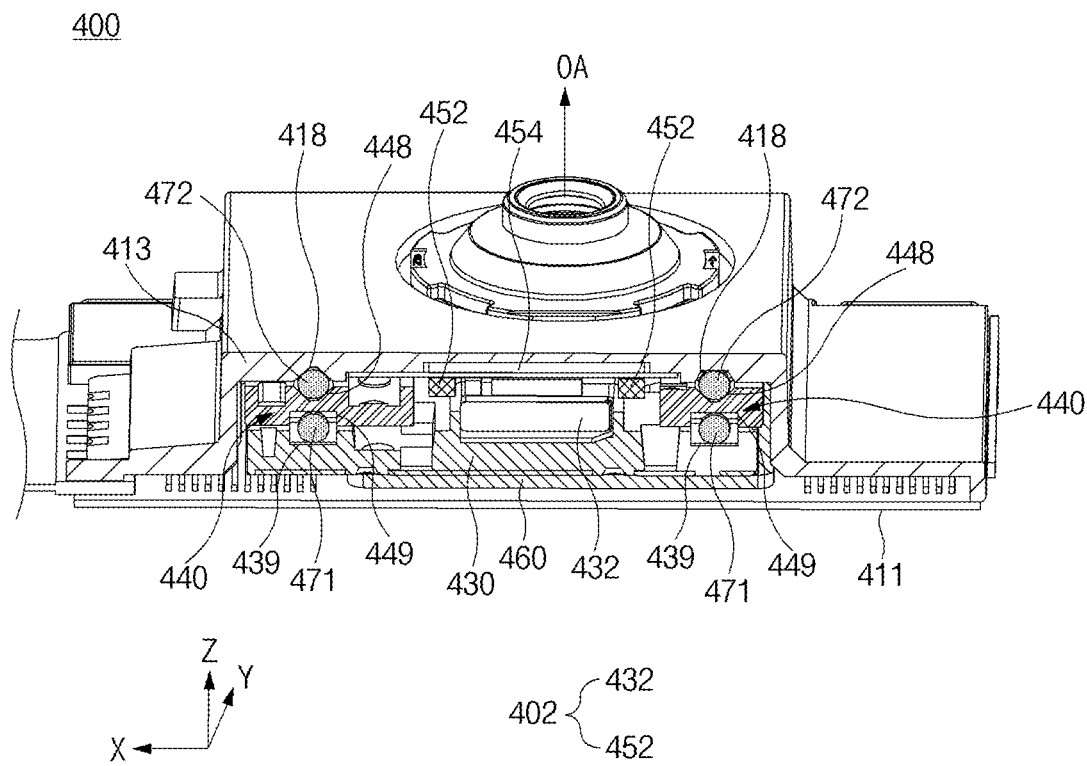
FIG. 9 illustrates a sectional view of the camera module according to an embodiment.
Figure 10:
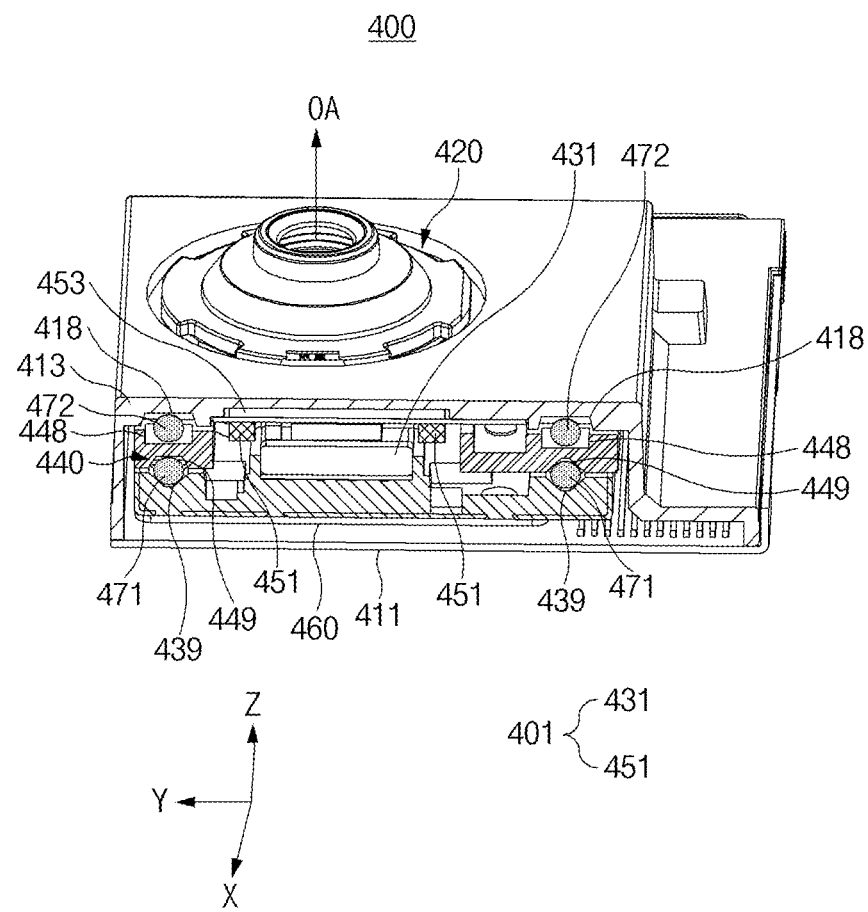
FIG. 10 illustrates a sectional view of the camera module according to an embodiment.

FIG. 9 illustrates a sectional view of the camera module according to an embodiment. FIG. 9 is a sectional view taken along line A-A of FIG. 4. FIG. 10 illustrates a sectional view of the camera module according to an embodiment. FIG. 10 is a sectional view taken along line B-B of FIG. 4.

Referring to FIG. 9, the camera module 400 may include the second drive member 402 for moving the sensor carrier 430 in the y-axis direction. The second drive member 402 may include the second coil 452 disposed in the lens holder 413 and the second magnet 432 disposed on the sensor carrier 430. The second coil 452 and the second magnet 432 may be disposed to at least partially overlap each other in the direction of the optical axis OA. When an electric current is applied to the second coil 452, a driving force may act on the second magnet 432 in the y-axis direction, and the sensor carrier 430 may move in the y-axis direction. Referring to FIG. 10, the sensor carrier 430 and the middle guide 440 may be coupled to move together in the y-axis direction by the first balls 471. For example, referring to FIGS. 9 and 10, due to the shapes of the first recesses 439 and the second recesses 449, the first balls 471 may roll in the x-axis direction, but may not roll in the y-axis direction. Accordingly, when an electric current is applied to the second coil 452, the middle guide 440 and the sensor carrier 430 may move together in the y-axis direction. At this time, the second balls 472 may provide a rolling frictional force between the moving middle guide 440 and the fixed lens holder 413. For example, referring to FIG. 10, the second balls 472 may roll in the spaces between the third recesses 448 and the fourth recesses 418 extending in the y-axis direction.

Referring to FIG. 10, the camera module 400 may include the first drive member 401 for moving the sensor carrier 430 in the x-axis direction. The first drive member 401 may include the first coil 451 disposed in the lens holder 413 and the first magnet 431 disposed on the sensor carrier 430. The first coil 451 and the first magnet 431 may be disposed to at least partially overlap each other in the direction of the optical axis OA. When an electric current is applied to the first coil 451, a driving force may act on the first magnet 431 in the x-axis direction, and the sensor carrier 430 may move in the x-axis direction. At this time, the middle guide 440 may not move in the x-axis direction. For example, referring to FIGS. 9 and 10, due to the shapes of the third recesses 448 and the fourth recesses 418, the second balls 472 may roll in the y-axis direction, but may not roll in the x-axis direction. Accordingly, when an electric current is applied to the first coil 451, the middle guide 440 and the lens holder 413 may be fixed in the x-axis direction. In an embodiment, the sensor carrier 430 may move in the x-axis direction relative to the middle guide 440. Referring to FIG. 9, the first balls 471 may provide a rolling frictional force between the moving sensor carrier 430 and the relatively fixed middle guide 440. For example, referring to FIG. 9, the first balls 471 may roll in the spaces between the first recesses 439 and the second recesses 449 extending in the x-axis direction.

Referring to FIGS. 9 and 10, the first balls 471 and the second balls 472 may be disposed to at least partially overlap each other when viewed in the direction of the optical axis OA. However, the positions of the first balls and the second balls are not limited to those illustrated in the drawings.

In an embodiment, drive signals of the first coil 451 and the second coil 452 may be transmitted through the second circuit board (e.g., the second circuit board 450 of FIG. 5). Referring to FIGS. 9 and 10, although it is exemplified that the first coil 451 and the second coil 452 are disposed in the fixed lens holder 413 and the first magnet 431 and the second magnet 432 are disposed on the moving sensor carrier 430, the disclosure is not necessarily limited thereto. In another embodiment, the first coil 451 and the second coil 452 may be disposed on the sensor carrier 430, and the first magnet 431 and the second magnet 432 may be disposed in the lens holder 413. In this case, drive signals of the first coil 451 and the second coil 452 may be transmitted through the connecting member (e.g., the connecting member 500 of FIGS. 5 and 6). Alternatively, drive signals of the first coil 451 and the second coil 452 may be transmitted through a third connecting member (not illustrated) that is disposed on at least a portion of the sensor carrier 430. For example, the connecting member 500 and the third connecting member (not illustrated) may be connected to the fixed substrate 490 (e.g., the second connector 492) and may obtain a drive signal from the printed circuit board (e.g., the printed circuit board 350 of FIG. 3C).

Figure 11:
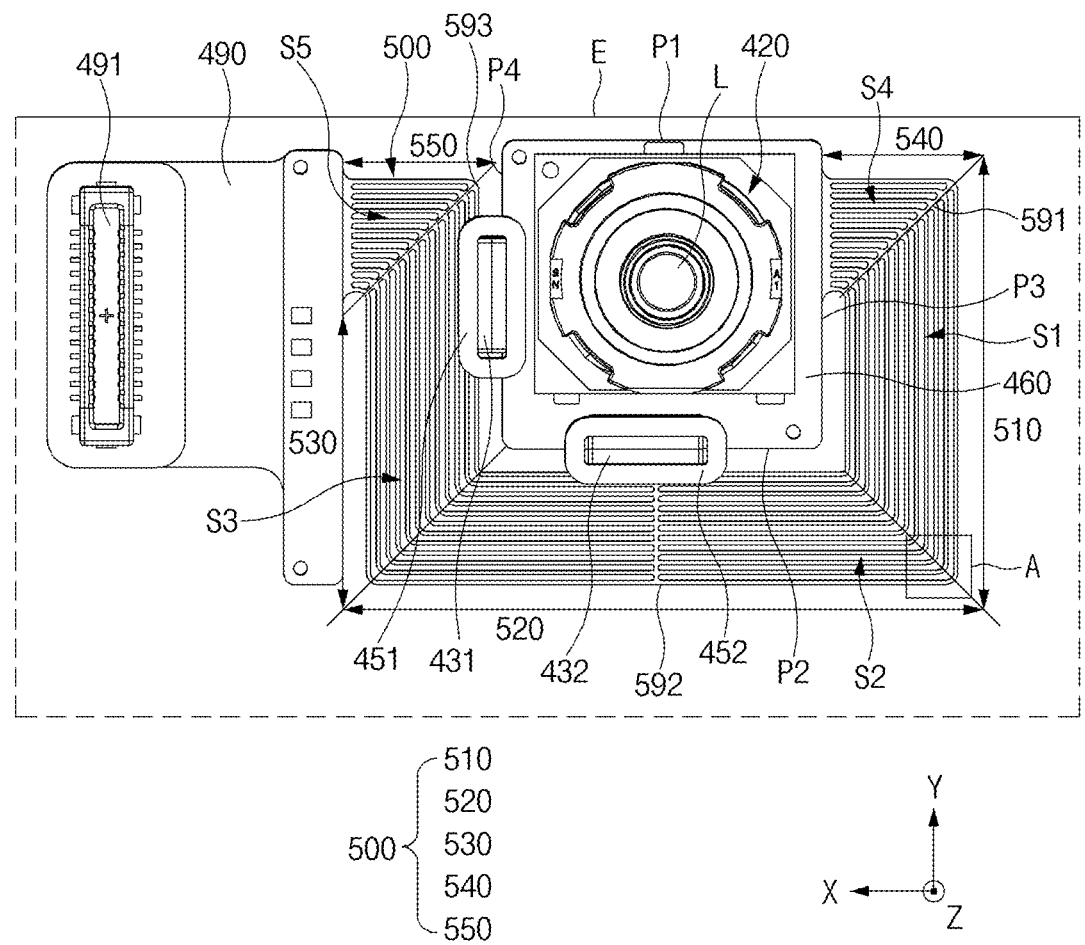
FIG. 11 illustrates a lens assembly, the circuit board, a connecting member, a first drive member, and a second drive member of the camera module according to an embodiment.

FIG. 11 illustrates the lens assembly, the circuit board, the connecting member, the first drive member, and the second drive member of the camera module according to an embodiment.

Referring to FIG. 11, the lens assembly 420 may be disposed to at least partially overlap the circuit board 460 when viewed from above. For example, the lens L of the lens assembly 420 may be at least partially aligned with the image sensor (e.g., the image sensor 461 of FIG. 5) on the circuit board 460 in the direction of the optical axis OA.

In an embodiment, a first edge P1, a second edge P2, a third edge P3, and a fourth edge P4 may be defined on the circuit board 460. When viewed from above (e.g., when viewed in the z-axis direction or in the direction of the optical axis OA), the first edge P1 and the second edge P2 may be substantially parallel to each other and may be substantially perpendicular to the third edge P3 and the fourth edge P4. The third edge P3 and the fourth edge P4 may be substantially parallel to each other and may be substantially perpendicular to the first edge P1 and the second edge P2. For example, referring to FIG. 11, the first edge P1 and the second edge P2 may be parallel to the x-axis direction, and the third edge P3 and the fourth edge P4 may be parallel to the y-axis direction.

In an embodiment, the connecting member 500 may extend along at least two edges of the circuit board 460 that are adjacent to each other. For example, the connecting member 500 may extend adjacent to three edges among the four edges of the circuit board 460. For example, referring to FIG. 11, the connecting member 500 may extend from the third edge P3 of the circuit board 460. The connecting member 500 may extend to the fixed substrate along the third edge P3, the second edge P2, and the fourth edge P4 that are connected with each other.

In an embodiment, the connecting member 500 may electrically connect the circuit board 460 and the fixed substrate 490. The connecting member 500 may transmit an image-related electrical signal generated from the image sensor 461 to the fixed substrate 490.

In an embodiment, the first edge P1 of the circuit board 460 may be adjacent to a front edge E of the electronic device 300 (e.g., an edge of the display (e.g., the display 330 of FIG. 3C) or an edge of the front plate (e.g., the front plate 320 of FIG. 3C)). In an embodiment, the connecting member 500 may be configured so as not to extend between the first edge P1 of the circuit board 460 and the front edge E of the electronic device 300. Through such a configuration, the lens assembly 420 may be disposed as close as possible to the edge E (e.g., the edge facing the y-axis direction) of the electronic device 300. For example, a light receiving area (e.g., a punch hole or the camera area 306 of FIG. 3A) may be adjacent to the front edge E of the electronic device 300, and thus a reduced bezel area and a relatively expanded display area may be provided. For a similar purpose, the first drive member 401 and the second drive member 402 may be disposed to overlap the second edge P2, the third edge P3, or the fourth edge P4 of the circuit board 460 when viewed from above. In other words, the first drive member 401 and the second drive member 402 may be disposed at an edge other than the first edge P1. Referring to FIG. 11, the first drive member 401 may be disposed to overlap the fourth edge P4, and the second drive member 402 may be disposed to overlap the second edge P2.

In an embodiment, the connecting member 500 may include a slit portion having a plurality of slits formed therein. The slit portion may provide flexibility such that the circuit board 460 smoothly moves when an image stabilization function is performed.

FIG. 11 illustrates the camera module 400 in the normal state in which an image stabilization function is not performed.

In the normal state, the connecting member 500 may include a first area 510 in which first slits S1 extending in the y-axis direction are formed, a second area 520 in which second slits S2 extending in the x-axis direction are formed, and a third area 530 in which third slits S3 extending in the y-axis direction are formed. In an embodiment, the first slits S1 and the third slits S3 may provide flexibility when the circuit board 460 moves in the x-axis direction. In an embodiment, the second slits S2 may provide flexibility when the circuit board 460 moves in the y-axis direction.

In an embodiment, the circuit board 460 may be located between the first area 510 and the third area 530. For example, in the normal state, the first area 510 may extend at least partially parallel to the third edge P3 of the circuit board 460. For example, in the normal state, the second area 520 may extend at least partially parallel to the second edge P2 of the circuit board 460. For example, in the normal state, the third area 530 may extend at least partially parallel to the fourth edge P4 of the circuit board 460.

In an embodiment, the connecting member 500 may include a plurality of lines separated from one another by the slits S1, S2, S3, S4, and S5. Each of the plurality of lines may include one or more conductive patterns through which an electrical signal flows.

In an embodiment, the connecting member 500 may include a first connecting area 540 connecting the first area 510 and the circuit board 460 and a second connecting area 550 connecting the third area 530 and the fixed substrate 490. Fourth slits S4 extending in the x-axis direction may be formed in the first connecting area 540, and fifth slits S5 extending in the x-axis direction may be formed in the second connecting area 550.

In an embodiment, the connecting member 500 may include a bridge structure. The bridge structure may be provided in a form connecting the plurality of lines across the slits S1, S2, S3, S4, and S5. In an embodiment, the bridge structure may be configured to decrease excessive deformation of the connecting member 500 when the circuit board 460 moves in the x-axis direction and/or the y-axis direction. For example, the bridge structure may decrease a twist of the connecting member 500.

Figure 12A:
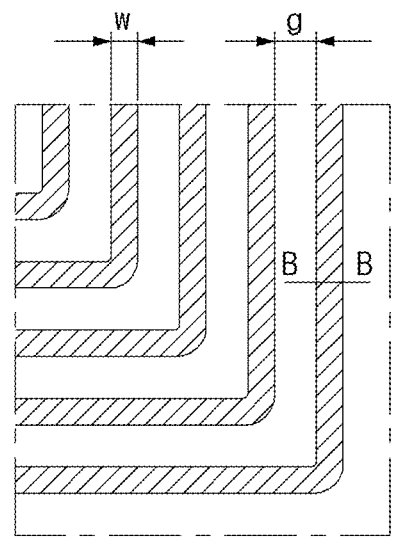
FIG. 12A illustrates the connecting member of the camera module according to an embodiment.
Figure 12B:
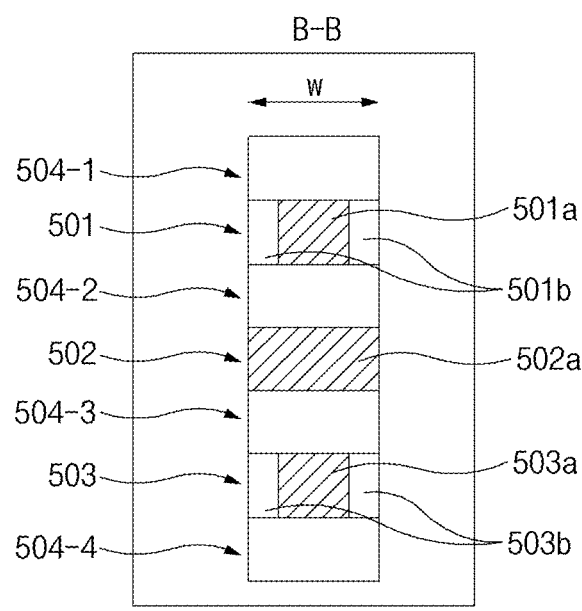
FIG. 12B illustrates the connecting member of the camera module according to an embodiment.

Referring to FIGS. 12A and 12B, the bridge structure may include a first bridge 591 formed between the first connecting area 540 and the first area 510, a third bridge 593 formed between the second connecting area 550 and the third area 530, and/or a second bridge 592 formed in the second area 520. However, the number and/or positions of bridge structures are not limited to that illustrated in the drawing. For example, a bridge structure may be included in the first area 510, the second area 520, the third area 530, the first connecting area 540, and/or the second connecting area 550.

For example, a bridge structure may be formed across each of the first area 510 and the second area 520. For example, a bridge may be formed across each of the second area 520 and the third area 530. For example, the bridge structure across the second area 520 may be referred to as the second bridge 592 illustrated in FIG. 11.

FIG. 12A illustrates the connecting member of the camera module according to an embodiment. FIG. 12B illustrates the connecting member of the camera module according to an embodiment.

For example, FIG. 12A is a blowup of portion A in FIG. 11. FIG. 12B is a sectional view taken along line B-B of FIG. 12A.

Referring to FIG. 12A, the plurality of lines included in the connecting member 500 may have a specified line width w. In the normal state, one of the plurality of lines may be spaced apart from another one adjacent thereto by a specified gap g. The specified gap g may vary when the circuit board 460 moves in the x-axis or y-axis direction. For example, the specified gap g may be referred to as the width of the slits S1, S2, S3, S4, and S5 illustrated in FIG. 11. For example, the line width w of the connecting member 500 may be about 100 μm, and the gap g may be about 150 μm. According to an embodiment, at least one of areas (e.g., the first area 510, the second area 520, the third area 530, the first connecting area 540, and the second connecting area 550) that form the connecting member 500 may have a width including the widths of about 12 lines and specified gaps therebetween.

Referring to FIG. 12B, each of the plurality of lines may include a plurality of layers when viewed in a cross-section. The plurality of layers may include a first layer 501 including a first conductive pattern 501a, a second layer 502 including a second conductive pattern 502a, and a plurality of insulating layers 504.

The first layer 501 may be disposed to make contact with two adjacent insulating layers 504-1 and 504-2 when viewed in the thickness direction (e.g., the lamination direction). The first layer 501 may have the first conductive pattern 501a formed therein. For example, the first layer 501 may include a first insulating portion 501b at least partially surrounding the first conductive pattern 501a. For example, the first conductive pattern 501a may be surrounded by the two insulating layers 504-1 and 504-2, which make contact with the first layer 501, and the first insulating portion 501b. The first conductive pattern 501a may not be exposed to the outside. Accordingly, a first conductive pattern 501a included in one line may be electrically insulated from a first conductive pattern 501a included in another line. For example, the first insulating portion 501b included in the first layer 501 may provide electrical insulation between the plurality of lines when an image stabilization function is performed so that the plurality of lines move. In an embodiment, the first conductive pattern 501a may be a signal line through which an image-related electrical signal is transmitted.

The second layer 502 may be disposed to make contact with two adjacent insulating layers 504-2 and 504-3 when viewed in the thickness direction (e.g., the lamination direction). The second layer 502 may be formed of the second conductive pattern 502a. For example, the second conductive pattern 502a may be exposed to the outside. In an embodiment, the second conductive pattern 502a may be a ground area to which a ground signal is applied. In an embodiment, a ground layer (e.g., the second layer 502) may be disposed between adjacent signal layers (e.g., the first layer 501 and a third layer 503). According to another embodiment (not illustrated), the second conductive pattern 502a of the second layer 502 may provide electrical insulation between the plurality of lines when the plurality of lines are moved by an insulating member formed in at least part of the gap g. For example, the connecting member 500 may include, in at least some of the slits S1, S2, S3, S4, and S5, a gel-type insulating member having fluidity, and thus the fluidity of the connecting member 500 and electrical insulation between the plurality of lines (or, layers) may be provided. For example, when an image stabilization operation provided by the first drive member and/or the second drive member is performed, the connecting member 500 may provide electrical insulation between the plurality of lines and the layers (e.g., the first layer 501 and the second layer 502) included in each of the lines.

In an embodiment, the plurality of layers may further include the third layer 503 including a third conductive pattern 503a.

The third layer 503 may be disposed to make contact with two adjacent insulating layers 504-3 and 504-4 when viewed in the thickness direction (e.g., the lamination direction). The third layer 503 may have the third conductive pattern 503a formed therein. For example, the third layer 503 may include a third insulating portion 503b at least partially surrounding the third conductive pattern 503a. For example, the third conductive pattern 503a may be surrounded by the insulating layer 504, which makes contact with the third layer 503, and the third insulating portion 503b. The third conductive pattern 503a may not be exposed to the outside. Accordingly, a third conductive pattern 503a included in one line may be electrically insulated from a third conductive pattern 503a included in another line. For example, the third insulating portion 503b included in the third layer 503 may provide electrical insulation between the plurality of lines when an image stabilization function is performed so that the plurality of lines move. In an embodiment, the third conductive pattern 503a may be a signal line through which an image-related electrical signal is transmitted.

In an embodiment, the first conductive pattern 501a, the second conductive pattern 502a, and the third conductive pattern 503a may contain a conductive material. For example, the conductive material may include copper. In an embodiment, the first insulating portion 501b, the third insulating portion 503b, and the insulating layers 504 may contain an insulating material (e.g., PI).

In some embodiments, at least one of the plurality of lines may have a line width of about 100 μm and a thickness of about 136.5 μm. For example, the first insulating layer 504-1 may have a thickness of about 20.5 μm. For example, the first layer 501 may have a thickness of about 18 μm. For example, the second insulating layer 504-2 may have a thickness of about 28.5 μm. The second layer 502 may have a thickness of about 6 μm. For example, the third insulating layer 504-3 may have a thickness of about 25 μm. For example, the third layer 503 may have a thickness of about 18 μm. For example, the fourth insulating layer 504-4 may have a thickness of about 20.5 μm.

Figure 13:
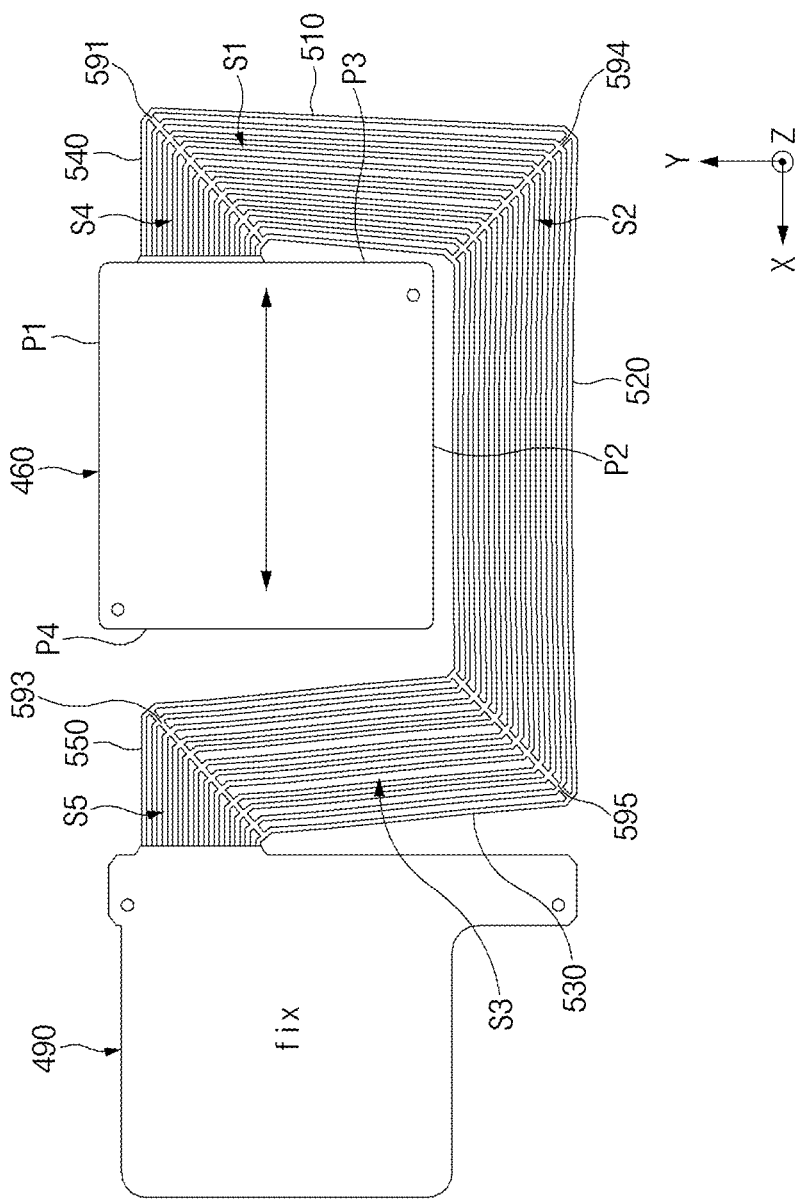
FIG. 13 illustrates the connecting member, a fixed substrate, and the circuit board when an image stabilization operation is performed.
Figure 14:
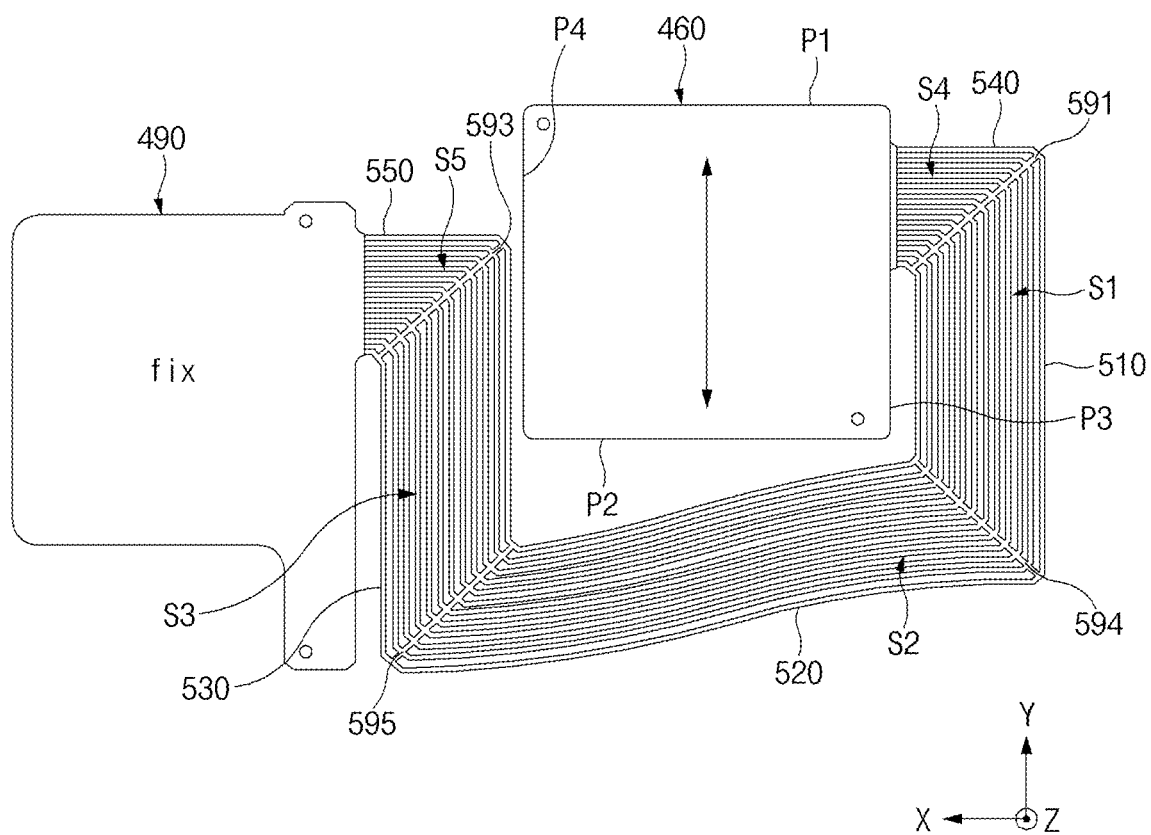
FIG. 14 illustrates the connecting member, the fixed substrate, and the circuit board when an image stabilization operation is performed.

FIG. 13 illustrates the connecting member, the fixed substrate, and the circuit board when an image stabilization operation is performed. FIG. 14 illustrates the connecting member, the fixed substrate, and the circuit board when an image stabilization operation is performed.

Some of the components of the camera module 400 illustrated in FIGS. 13 and 14 may be identical or similar to some of the components of the camera module 400 illustrated in FIG. 11, and repetitive descriptions will hereinafter be omitted.

In an embodiment, the camera module 400 may perform the first image stabilization operation of moving the positions of the image sensor 461 and the circuit board 460 by moving the sensor carrier (e.g., the sensor carrier 430 of FIGS. 5 and 6) in a first direction (e.g., the x-axis direction) substantially perpendicular to the optical axis OA in the situation in which image correction should be used due to an external impact or vibration.

In an embodiment, the camera module 400 may perform the second image stabilization operation of moving the positions of the image sensor 461 and the circuit board 460 by moving the sensor carrier (e.g., the sensor carrier 430 of FIGS. 5 and 6) in a second direction (e.g., the y-axis direction) substantially perpendicular to the optical axis OA and the first direction in the situation in which image correction should be used due to an external impact or vibration.

In an embodiment, the first image stabilization operation and the second image stabilization operation may be simultaneously or sequentially performed.

Referring to FIG. 13, the circuit board 460 may move in the x-axis direction when the first image stabilization operation is performed. For example, the circuit board 460 may move toward or away from the fixed substrate 490. The connecting member 500 may be deformed in the first image stabilization operation. For example, the gaps between the plurality of lines included in the connecting member 500 may be varied. For example, referring to FIG. 13, as the circuit board 460 moves in the −x-axis direction, the first area 510 of the connecting member 500 may be deformed in the direction toward the third edge P3 of the circuit board 460 along the −y-axis direction, and the third area 530 of the connecting member 500 may be deformed in the direction away from the fourth edge P4 of the circuit board 460 along the +y-axis direction. The second area 520 of the connecting member 500 may be less deformed than the first area 510 and the third area 530.

In an embodiment, the first slits S1 included in the first area 510 and the third slits S3 included in the third area 530 may provide flexibility such that the plurality of lines easily move in response to a movement of the circuit board 460.

Referring to FIG. 14, the circuit board 460 may move in the y-axis direction when the second image stabilization operation is performed. For example, the circuit board 460 may move toward or away from the second area 520 of the connecting member 500. The connecting member 500 may be deformed in the second image stabilization operation. For example, the gaps between the plurality of lines included in the connecting member 500 may be varied. For example, referring to FIG. 14, as the circuit board 460 moves in the +y-axis direction, the second area 520 of the connecting member 500 may be deformed in the direction toward the second edge P2 of the circuit board 460 along the −x-axis direction. The first area 510 and the third area 530 of the connecting member 500 may be less deformed than the second area 520.

In an embodiment, the second slits S2 included in the second area 520 may provide flexibility such that the plurality of lines easily move in response to a movement of the circuit board 460.

Referring to FIGS. 13 and 14, the connecting member 500 may include the bridge structure. The bridge structure may be configured to decrease excessive deformation of the connecting member 500 when the circuit board 460 moves in the x-axis direction and/or the y-axis direction. For example, the bridge structure may decrease a twist of the connecting member 500. The bridge structure may include the first bridge 591 formed between the first connecting area 540 and the first area 510, a fourth bridge 594 formed between the first area 510 and the second area 520, a fifth bridge 595 formed between the second area 520 and the third area 530, and the third bridge 593 formed between the second connecting area 550 and the third area 530. As described above, the number and/or positions of bridge structures are not limited to that illustrated in the drawings. For example, the bridge structure illustrated in FIGS. 13 and 14 may be understood as including the fourth bridge 594 and the fifth bridge 595 instead of the second bridge 592, compared to the bridge structure illustrated in FIG. 11.

Figure 15:
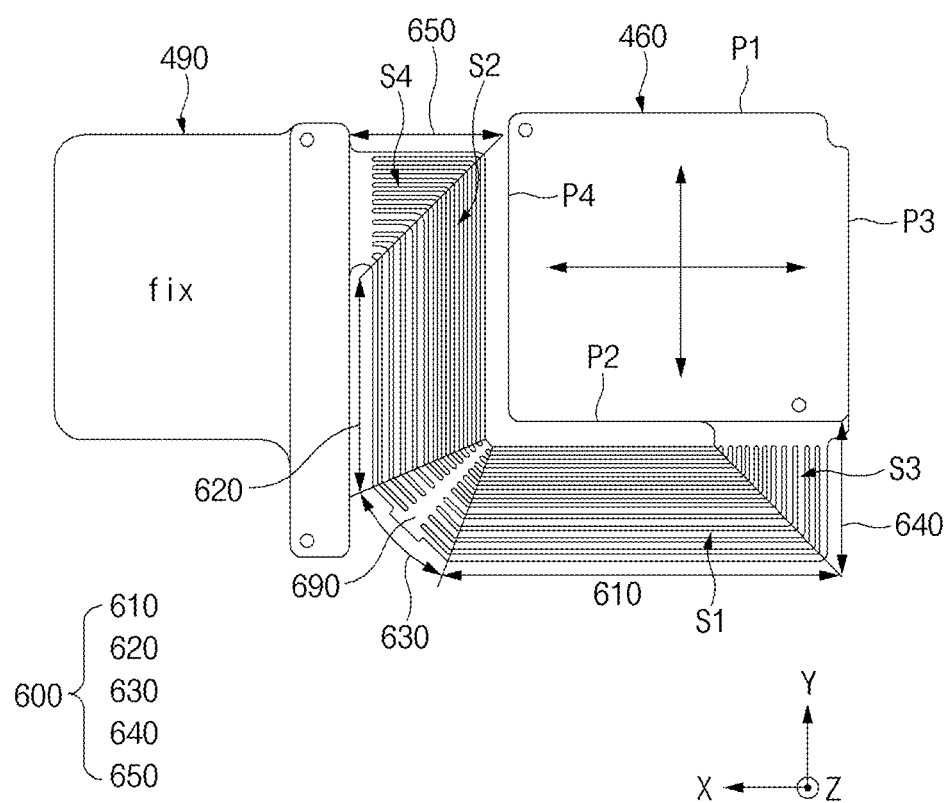
FIG. 15 illustrates a circuit board, a fixed substrate, and a connecting member of a camera module according to another embodiment.

FIG. 15 illustrates a circuit board, a fixed substrate, and a connecting member of a camera module according to another embodiment.

Some of the components of the camera module 400 illustrated in FIG. 15 may be identical or similar to some of the components of the camera module 400 illustrated in FIGS. 11, 13, and 14, and repetitive descriptions will hereinafter be omitted.

Referring to FIG. 15, the camera module 400 may include the circuit board 460 on which an image sensor 461 is disposed, the fixed substrate 490, and the connecting member 600 extending from the circuit board 460 to the fixed substrate 490. In an embodiment, the connecting member 600 may electrically connect the circuit board 460 and the fixed substrate 490. The connecting member 600 may transmit an image-related electrical signal generated from the image sensor 461 to the fixed substrate.

In an embodiment, the connecting member 600 may extend along two adjacent edges among four edges of the circuit board 460. For example, referring to FIG. 15, the connecting member 600 may extend from a second edge P2 of the circuit board 460. The connecting member 600 may extend along the second edge P2 and a fourth edge P4 connected with each other and may be connected to the fixed substrate.

FIG. 15 illustrates the camera module in a normal state in which an image stabilization function is not performed.

In the normal state, the connecting member 600 may include a first area 610 in which first slits S1 extending in the x-axis direction are formed, a second area 620 in which second slits S2 extending in the y-axis direction are formed, and a third area 630 connecting the first area 610 and the second area 620. In an embodiment, the first slits S1 and the second slits S2 may provide flexibility when the circuit board 460 moves in the x-axis direction and/or the y-axis direction. In the normal state, the first area 610 may extend at least partially parallel to the second edge P2 of the circuit board 460. For example, in the normal state, the second area 620 may extend at least partially parallel to the fourth edge P4 of the circuit board 460. In an embodiment, the connecting member 600 may include a first connecting area 640 connecting the first area 610 and the circuit board 460 and a second connecting area 650 connecting the second area 620 and the fixed substrate 490. Third slits S3 extending in the y-axis direction may be formed in the first connecting area 640, and fourth slits S4 extending in the x-axis direction may be formed in the second connecting area 650.

In an embodiment, the connecting member 600 may include a bridge structure 690. For example, referring to FIG. 15, the bridge structure 690 may be provided in the third area 630. The bridge structure may be provided in a form connecting a plurality of lines across the slits S1, S2, S3, and S4. In an embodiment, the bridge structure 690 may be configured to decrease excessive deformation of the connecting member 600 when the circuit board 460 moves in the x-axis direction and/or the y-axis direction. For example, the bridge structure 690 may decrease a twist of the connecting member 600. Referring to FIG. 15, the bridge structure 690 may be formed between the first area 610 and the second area 620. However, the number and/or positions of bridge structures 690 are not limited to that illustrated in the drawing.

FIG. illustrates a circuit board, a fixed substrate, and a connecting member of a camera module according to another embodiment. In describing FIG. 16, repetitive descriptions identical to ones given with reference to FIGS. 11 and 15 will be omitted.

Figure 16:
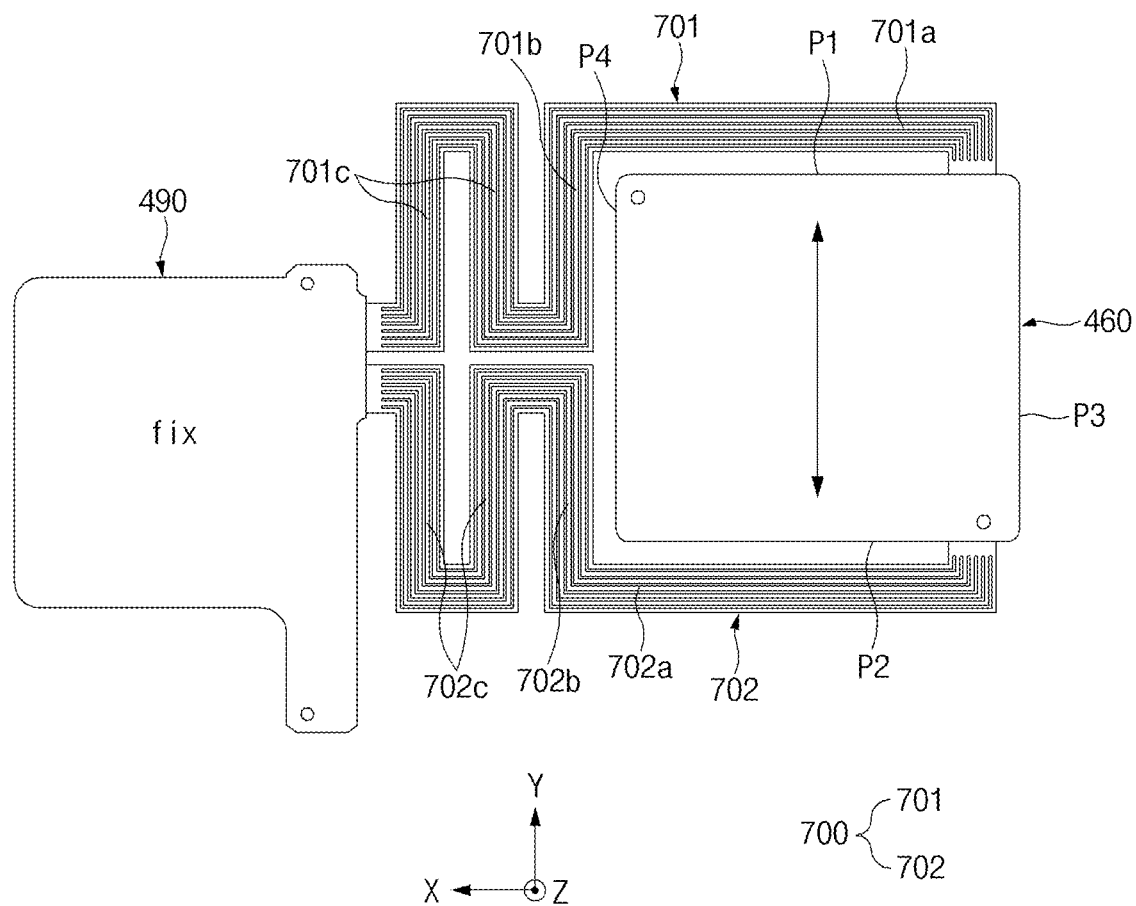
FIG. 16 illustrates a circuit board, a fixed substrate, and a connecting member of a camera module according to another embodiment.

Referring to FIG. 16, the connecting member 700 may include a connecting member 1-1 701 and a connecting member 1-2 702. The connecting member 1-1 701 and the connecting member 1-2 702 may have a substantially symmetrical shape when viewed in the direction of an optical axis OA in a normal state, but are not necessarily limited thereto.

In an embodiment, the connecting member 1-1 701 and the connecting member 1-2 702 may have a smaller width than the connecting members 500 and 600 illustrated in FIGS. 11 and 15. The connecting members having a small width may provide a relatively low modulus of elasticity and may support a movement of the circuit board 460 in an image stabilization operation accordingly.

In an embodiment, the connecting member 1-1 701 may extend from a first edge P1 of the circuit board 460 to the fixed substrate 490. The connecting member 1-1 701 may extend along the first edge P1 and a fourth edge P4 that are two adjacent edges of the circuit board 460. For example, in the normal state, a first area 701a of the connecting member 1-1 701 may at least partially extend along the first edge P1, and a second area 701b of the connecting member 1-1 701 may at least partially extend along the fourth edge P4.

In an embodiment, the connecting member 1-1 701 may include a first extension area 701c extending from the second area 701b to the fixed substrate 490. The first extension area 701c may be configured such that the connecting member 1-1 701 has a sufficient extension length. For example, the first extension area 701c may extend to a sufficient length so as not to obstruct a movement of the circuit board 460 according to the image stabilization operation. For example, the extension area 1-1 701c extending to the sufficient length may decrease the elastic modulus of the connecting member 1-1 701. Accordingly, it may be advantageous for a movement of the circuit board 460 in the image stabilization operation. In an embodiment, the first extension area 701c may extend by a length greater than the gap between the second area 701b and the fixed substrate 490 in the x-axis direction. For example, the first extension area 701c may include an area extending in the x-axis direction and/or an area extending in the y-axis direction. For example, a plurality of areas extending in the x-axis direction and/or a plurality of areas extending in the y-axis direction may be formed. For example, the plurality of areas extending in the y-axis direction may at least partially overlap one another when viewed in the x-axis direction.

In an embodiment, the connecting member 1-2 702 may extend from a second edge P2 of the circuit board 460 to the fixed substrate 490. The connecting member 1-2 702 may extend along the second edge P2 and the fourth edge P4 that are two adjacent edges of the circuit board 460. For example, in the normal state, a third area 702a of the connecting member 1-2 702 may at least partially extend along the second edge P2, and a fourth area 702b of the connecting member 1-2 702 may at least partially extend along the fourth edge P4.

In an embodiment, the connecting member 1-2 702 may include a second extension area 702c extending from the fourth area 702b to the fixed substrate 490. The second extension area 702c may be configured such that the connecting member 1-2 702 has a sufficient extension length. For example, the second extension area 702c may extend to a sufficient length so as not to obstruct a movement of the circuit board 460 according to the image stabilization operation. For example, the second extension area 702c extending to the sufficient length may decrease the elastic modulus of the connecting member 1-2 702. Accordingly, it may be advantageous for a movement of the circuit board 460 in the image stabilization operation. In an embodiment, the second extension area 702c may extend by a length greater than the gap between the fourth area 702b and the fixed substrate 490 in the x-axis direction. For example, the second extension area 702c may include an area extending in the x-axis direction and/or an area extending in the y-axis direction. For example, a plurality of areas extending in the x-axis direction and/or a plurality of areas extending in the y-axis direction may be formed. For example, the plurality of areas extending in the y-axis direction may at least partially overlap one another when viewed in the x-axis direction.

Figure 17A:
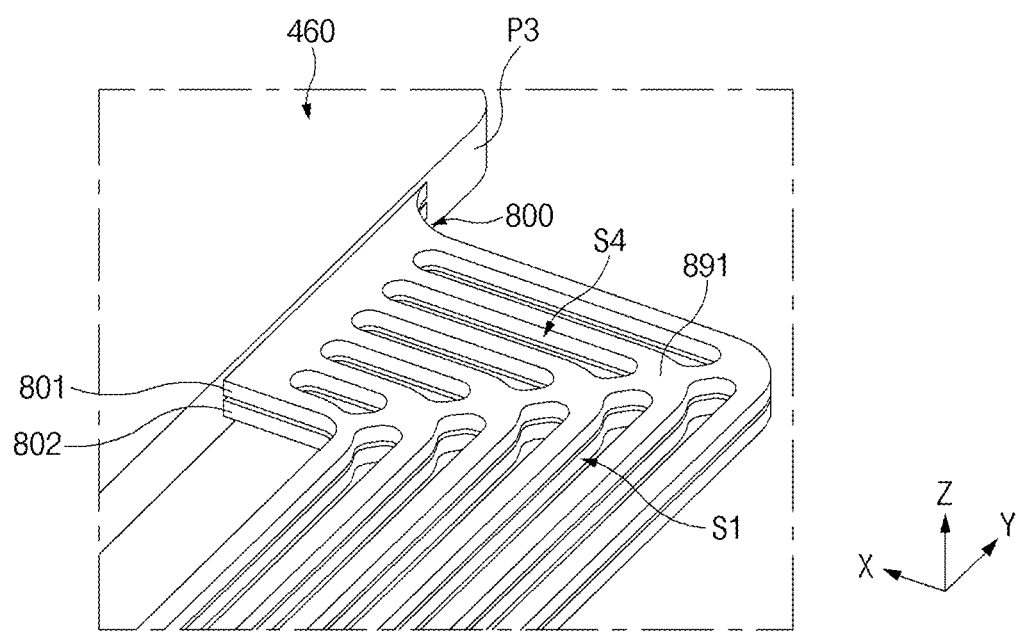
FIG. 17A illustrates a circuit board, a fixed substrate, and a connecting member of a camera module according to another embodiment.
Figure 17B:
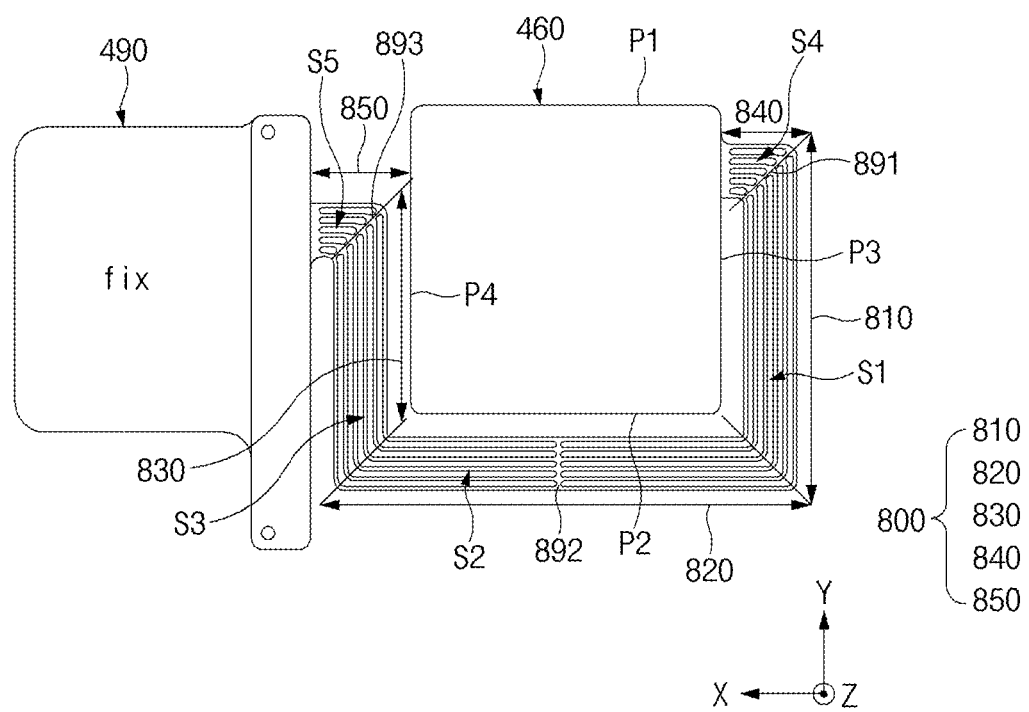
FIG. 17B illustrates the circuit board, the fixed substrate, and the connecting member of the camera module according to the other embodiment.

FIG. 17A illustrates a circuit board, a fixed substrate, and a connecting member of a camera module according to another embodiment. FIG. 17B illustrates the circuit board, the fixed substrate, and the connecting member of the camera module according to the other embodiment.

The connecting member 800 illustrated in FIG. 17A may include a first layer group 801 and a second layer group 802 stacked in the thickness direction. Each of the first layer group 801 and the second layer group 802 illustrated may include at least some of the plurality of layers illustrated in FIG. 12.

Referring to FIG. 17B, the connecting member 800 may include a first area 810, a second area 820, a third area 830, a first connecting area 840, and a second connecting area 850. The areas may be referred to as the areas 510, 520, 530, 540, and 550 illustrated in FIG. 11.

Referring to FIGS. 17A and 17B, a bridge structure may include a first bridge 891, a second bridge 892, and a third bridge 893. The bridges 891, 892, and 893 may be referred to as the bridges 591, 592, and 593 illustrated in FIG. 11.

Referring to FIGS. 17A and 17B, the connecting member 800 may have a smaller width than the connecting members 500 and 600 illustrated in FIGS. 11 and 15. The connecting member having a small width may provide a relatively low modulus of elasticity and may support a movement of the circuit board in an image stabilization operation accordingly.

Figure 18A:
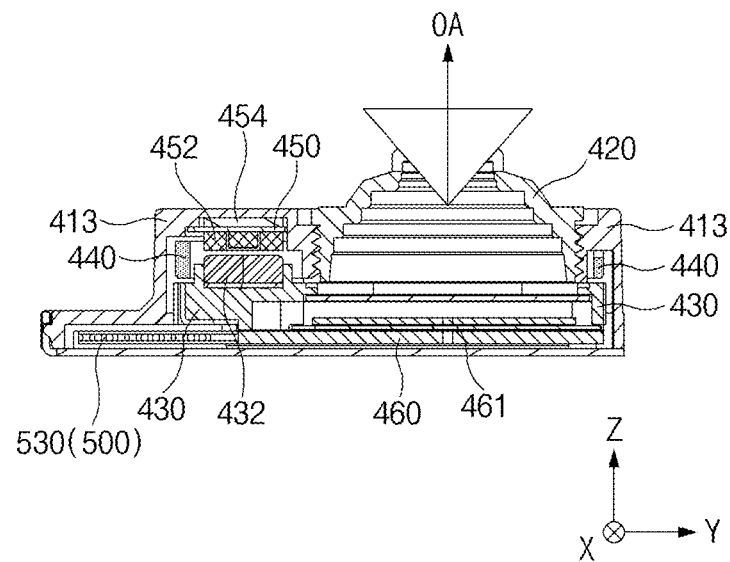
FIG. 18A illustrates a sectional view of the camera module according to an embodiment.
Figure 18B:
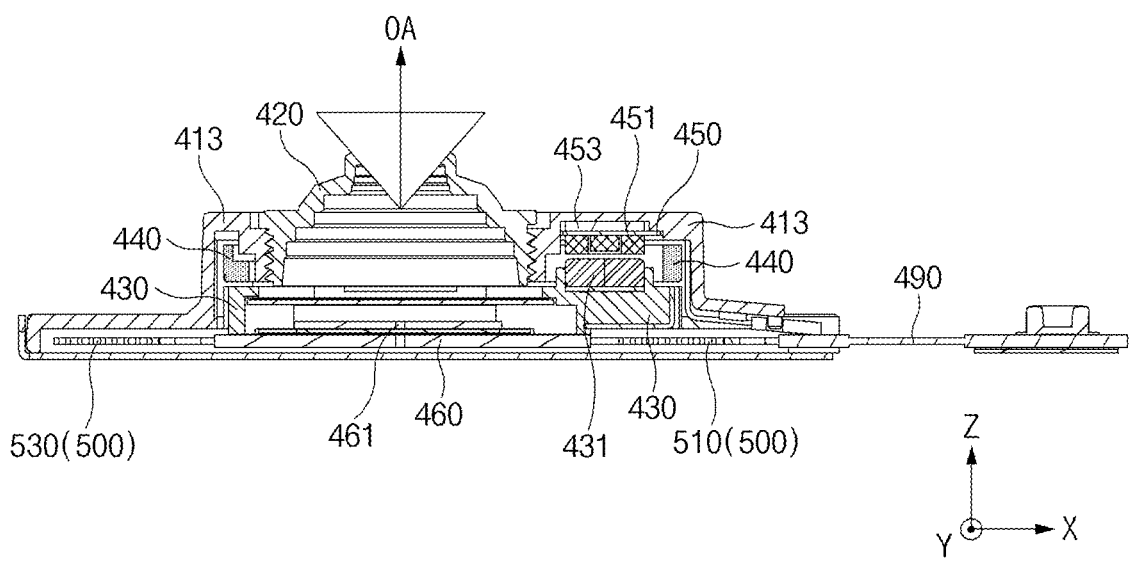
FIG. 18B illustrates a sectional view of the camera module according to an embodiment.

FIG. 18A illustrates a sectional view of the camera module according to an embodiment. FIG. 18B illustrates a sectional view of the camera module according to an embodiment.

For example, FIG. 18A is a sectional view taken along line A-A of FIG. 7, and FIG. 18B is a sectional view taken along line B-B of FIG. 7. FIGS. 18A and 18B illustrate components (the lens holder 413 and the lens assembly 420) omitted in FIG. 7 for ease of description.

Referring to FIG. 18A, the second magnet 432 may be disposed on the sensor carrier 430, and the second coil 452 may be disposed in the lens holder 413. In an embodiment, the second magnet 432 and the second coil 452 may be disposed to at least partially face each other in the direction of the optical axis OA. In an embodiment, at least a portion of the second coil 452 may be disposed on a first area of the second circuit board 450 located in the lens holder 413. A portion of the second circuit board 450 may extend outside the lens holder 413 and may be connected to the fixed substrate 490. In an embodiment, the second circuit board 450 may be configured to transmit a drive signal of the second coil 452.

Referring to FIGS. 18A, 7, and 11 together, at least one of the second coil 452 or the second magnet 432 may at least partially overlap the connecting member 500 when viewed in the direction of the optical axis OA (e.g., the z-axis direction). For example, the second coil 452 or the second magnet 432 may overlap a portion of the second area 520 of the connecting member 500 in the direction of the optical axis OA (e.g., the z-axis direction).

Referring to FIG. 18B, the first magnet 431 may be disposed on the sensor carrier 430, and the first coil 451 may be disposed in the lens holder 413. In an embodiment, the first magnet 431 and the first coil 451 may be disposed to at least partially face each other in the direction of the optical axis OA. In an embodiment, at least a portion of the first coil 451 may be disposed on a second area of the second circuit board 450 located in the lens holder 413. A portion of the second circuit board 450 may extend outside the lens holder 413 and may be connected to the fixed substrate 490. In an embodiment, the second circuit board 450 may be configured to transmit a drive signal of the first coil 451.

Referring to FIGS. 18B, 7, and 11 together, at least one of the first coil 451 or the first magnet 431 may at least partially overlap the connecting member 500 when viewed in the direction of the optical axis OA (e.g., the z-axis direction). For example, the first coil 451 or the first magnet 431 may overlap a portion of the third area 530 of the connecting member 500 in the direction of the optical axis OA (e.g., the z-axis direction).

In an embodiment, the first magnet 431 and the second magnet 432 may be referred to as moving magnets in that the first magnet 431 and the second magnet 432 are disposed on the sensor carrier 430 and move together with the sensor carrier 430. The first coil 451 and the second coil 452 may be referred to as fixed coils in that the first coil 451 and the second coil 452 are fixed to the lens holder 413 together with the lens assembly 420. In an embodiment, in an image stabilization operation, the sensor carrier 430, together with the middle guide 440, may move in the y-axis direction with respect to the fixed lens holder 413, and/or the sensor carrier 430 may move in the x-axis direction relative to the middle guide 440. When the sensor carrier 430 moves in the x-axis direction, the middle guide 440 may be fixed to the lens holder 413.

Figure 19A:
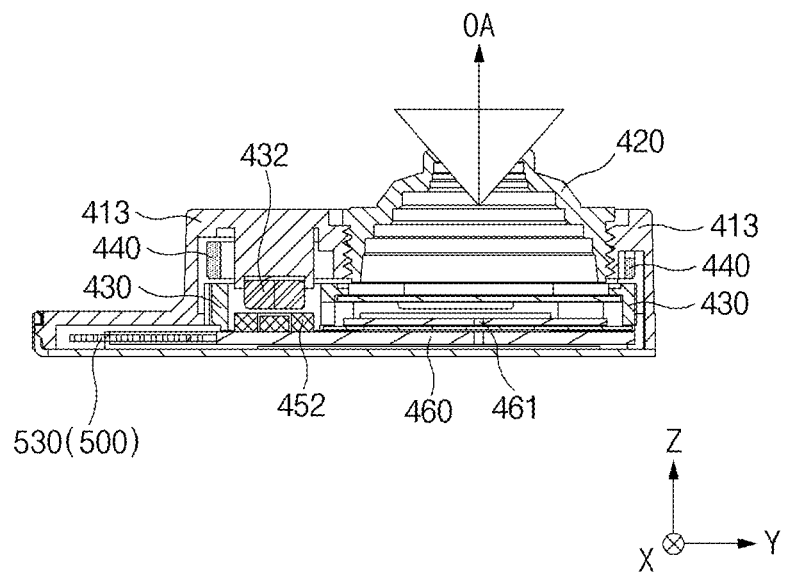
FIG. 19A illustrates a sectional view of a camera module according to another embodiment.
Figure 19B:
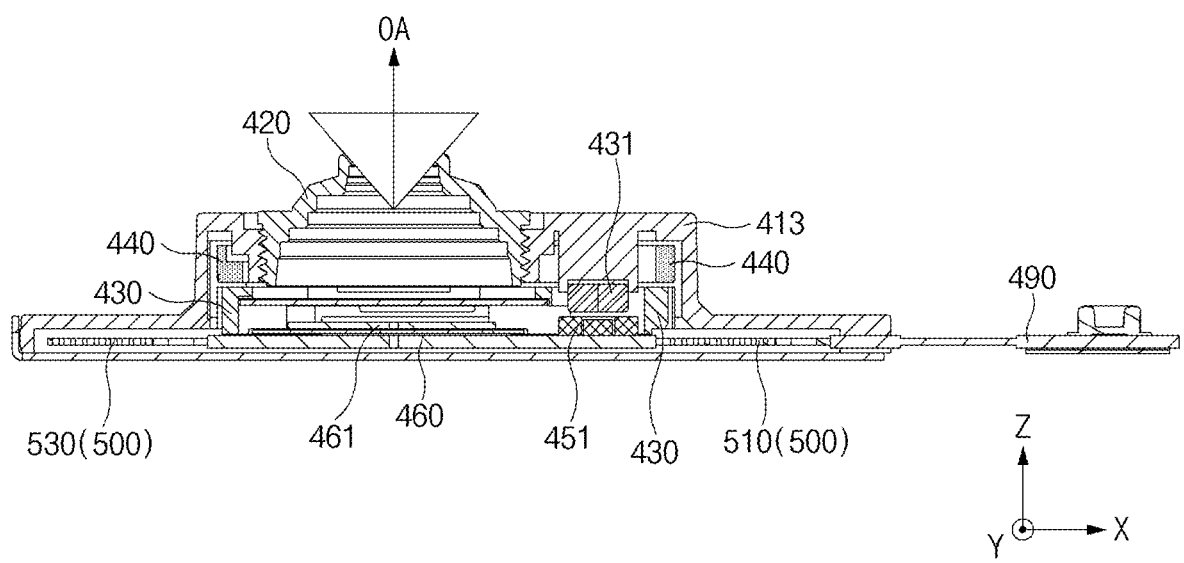
FIG. 19B illustrates a sectional view of the camera module according to the other embodiment.

FIG. 19A illustrates a sectional view of a camera module according to another embodiment. FIG. 19B illustrates a sectional view of the camera module according to the other embodiment.

For example, FIG. 19A is a sectional view taken along line A-A of FIG. 7, and FIG. 19B is a sectional view taken along line B-B of FIG. 7. FIGS. 19A and 19B illustrate components (the lens holder 413 and the lens assembly 420) omitted in FIG. 7 for ease of description.

Unlike in FIGS. 18A and 18B, the second circuit board 450 having the coils 451 and 452 disposed thereon may be omitted in the camera module according to the embodiment illustrated in FIGS. 19A and 19B.

Referring to FIG. 19A, the second magnet 432 may be disposed in the lens holder 413, and the second coil 452 may be disposed on the sensor carrier 430. In an embodiment, the second magnet 432 and the second coil 452 may be disposed to at least partially face each other in the direction of the optical axis OA. For example, the second coil 452 may be disposed on the circuit board 460 and may be located in a surrounding area of the image sensor 461. In an embodiment, the connecting member 500 may connect the circuit board 460 and the fixed substrate 490. The connecting member 500 may be configured to transmit an image-related signal generated from the image sensor 461 and a drive signal of the second coil 452.

Referring to FIG. 19B, the first magnet 431 may be disposed in the lens holder 413, and the first coil 451 may be disposed on the sensor carrier 430. In an embodiment, the first magnet 431 and the first coil 451 may be disposed to at least partially face each other in the direction of the optical axis OA. For example, the first coil 451 may be disposed on the circuit board 460 and may be located in a surrounding area of the image sensor 461. In an embodiment, the connecting member 500 may connect the circuit board 460 and the fixed substrate 490. The connecting member 500 may be configured to transmit an image-related signal generated from the image sensor 461 and a drive signal of the first coil 451.

In an embodiment, the first magnet 431 and the second magnet 432 may be referred to as fixed magnets in that the first magnet 431 and the second magnet 432 are fixed to the lens holder 413 together with the lens assembly 420. The first coil 451 and the second coil 452 may be referred to as moving coils in that the first coil 451 and the second coil 452 are disposed on the sensor carrier 430 and move together with the sensor carrier 430. In an embodiment, in an image stabilization operation, the sensor carrier 430, together with the middle guide 440, may move in the y-axis direction with respect to the fixed lens holder 413, and/or the sensor carrier 430 may move in the x-axis direction relative to the middle guide 440. When the sensor carrier 430 moves in the x-axis direction, the middle guide 440 may be fixed to the lens holder 413.

Figure 20A:
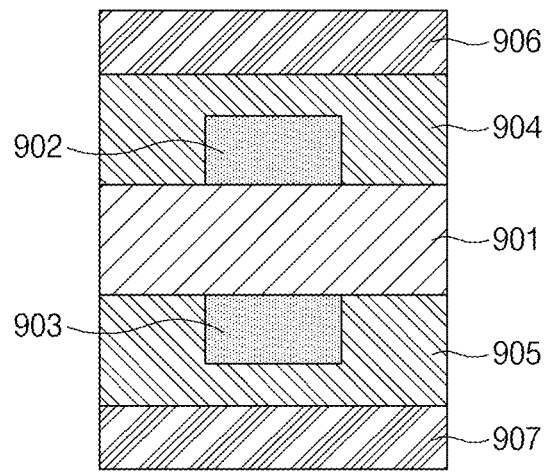
FIG. 20A illustrates a section of a connecting member of a camera module according to another embodiment.
Figure 20B:
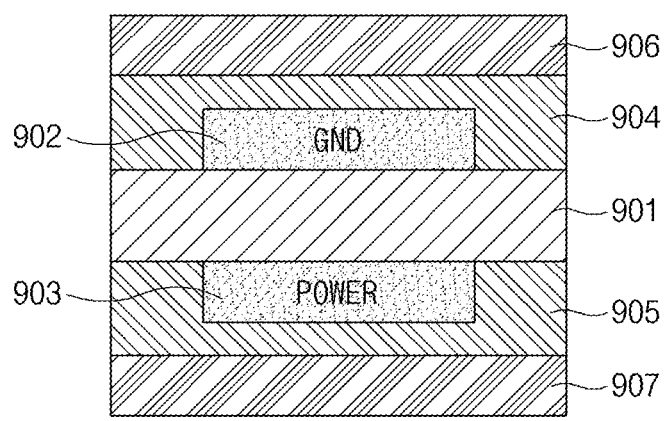
FIG. 20B illustrates a section of the connecting member of the camera module according to the other embodiment.

FIG. 20A illustrates a section of a connecting member of a camera module according to another embodiment. FIG. 20B illustrates a section of the connecting member of the camera module according to the other embodiment.

For example, FIGS. 20A and 20B may be views illustrating another example of FIG. 12B.

Referring to FIGS. 20A and 20B, the connecting member 500 may include a plurality of layers when viewed in the section. In an embodiment, the connecting member 500 may include a base film 901, a first conductive pattern 902 and a second conductive pattern 903 located on opposite surfaces of the base film 901, a first cover film 906, and a second cover film 907. In an embodiment, the first conductive pattern 902 and the second conductive pattern 903 may be printed on the base film 901. The first conductive pattern 902 may be insulated by a first adhesive layer 904, and the second conductive pattern 903 may be insulated by a second adhesive layer 905. In an embodiment, the first adhesive layer 904 and the second adhesive layer 905 may contain an insulating adhesive material. The first cover film 906 may be attached to the first adhesive layer 904. The second cover film 907 may be attached to the second adhesive layer 905. In various embodiments, the first conductive pattern 902 and the first adhesive layer 904 may be referred to as the first layer 501 of FIG. 12B. The second conductive pattern 903 and the second adhesive layer 905 may be referred to as the third layer 503 of FIG. 12B.

Referring to FIGS. 20A and 20B, the connecting member 500 may include layers stacked on the opposite surfaces of the base film 901. For example, an additional conductive pattern and an additional adhesive layer may be disposed between the first adhesive layer 904 and the first cover film 906. For example, an additional conductive pattern and an additional adhesive layer may be disposed between the second adhesive layer 905 and the second cover film 907. For example, the connecting member 500 may include layers stacked in a symmetrical form with respect to the base film 901. In another embodiment (not illustrated), the connecting member 500 may include layers stacked in an asymmetrical form with respect to the base film 901. For example, an adhesive layer 1-1 (including a conductive pattern), a cover film 1-1, an adhesive layer 1-2 (including a conductive pattern), and a cover film 1-2 may be stacked over the base film 901, and a second adhesive layer (including a conductive pattern) and a second cover film may be stacked under the base film 901. For example, two layers may be stacked over the base film 901, and one layer may be stacked under the base film 901.

In various embodiments, each of the first conductive pattern 902 and the second conductive pattern 903 may be provided as a signal transmission line. For example, an image-related signal and/or a coil drive signal may be applied to the first conductive pattern 902 and the second conductive pattern 903.

In various embodiments, one of the first conductive pattern 902 and the second conductive pattern 903 may be provided as a power supply line, and the other may be provided as a ground area.

According to embodiments of the disclosure, an electronic device 300 including a camera module 400 is disclosed. The camera module 400 may include a lens assembly 420 including a lens L, a lens holder 413 in which the lens assembly 420 is fixedly disposed, a sensor carrier 430 that includes an image sensor 461 at least partially aligned with an optical axis OA of the lens L and a circuit board 460 electrically connected with the image sensor 461 and that moves in a first axial direction (e.g., the x-axis direction) perpendicular to the optical axis OA and a second axial direction (e.g., the y-axis direction) perpendicular to the optical axis OA and the first axial direction (e.g., the x-axis direction), a first drive member 401 that moves the sensor carrier 430 in the first axial direction (e.g., the x-axis direction) and that includes a first coil 451 disposed on one of the lens holder 413 or the sensor carrier 430 and a first magnet 431 disposed on the other, a second drive member 402 that moves the sensor carrier 430 in the second axial direction (e.g., the y-axis direction) and that includes a second coil 452 disposed on one of the lens holder 413 or the sensor carrier 430 and a second magnet 432 disposed on the other, a fixed substrate 490 adjacent to the sensor carrier 430 and fixed in a specified position, and a connecting member 500 that extends from the circuit board 460 to the fixed substrate 490 and that extends to surround at least three interconnected edges P2, P3, and P4 of the circuit board 460 when viewed in a direction of the optical axis OA. The connecting member 500 may include at least one slit S1, S2, or S3 that extends in an extension direction of the connecting member 500.

In various embodiments, the connecting member 500 may include a first area 510 and a third area 530 that extend substantially in a first direction and a second area 520 that extends in a second direction perpendicular to the first direction. The first area 510 may be disposed at least partially parallel to a first edge P1 of the circuit board. The second area 520 may be disposed at least partially parallel to a second edge P2 of the circuit board 460, the second edge P2 being connected to the first edge P1. The third area 530 may be disposed at least partially parallel to a third edge P3 of the circuit board 460, the third edge P3 being connected to the second edge P2.

In various embodiments, each of the first area 510 and the third area 530 may include first slits S1 that extend in the first direction, and the second area 520 may include second slits S2 that extend in the second direction.

In various embodiments, the first direction may be parallel to the second axial direction, and the second direction may be parallel to the first axial direction.

In various embodiments, the connecting member 500 may be located on substantially the same plane as the circuit board 460 and the fixed substrate 490.

In various embodiments, the connecting member 500 may further include a first connecting area 540 that connects the first area 510 and the first edge P1 of the circuit board 460 and a second connecting area 550 that connects the third area 530 and the fixed substrate 490.

In various embodiments, the circuit board 460 may further include a fourth edge P4 that connects the first edge P1 and the third edge P3, and the camera module 400 may be disposed such that the fourth edge P4 is adjacent to an edge E of the electronic device 300, or another camera module included in the electronic device.

In various embodiments, the connecting member 500 may include a bridge that extends across the slit S1, S2, S3, S4, or S5, and the bridge may be formed between the first area 510 and the second area 520 or between the second area 520 and the third area 530.

In various embodiments, the first magnet 431 and the first coil 451 may at least partially overlap each other when viewed in the direction of the optical axis OA, and the second magnet 432 and the second coil 452 may at least partially overlap each other when viewed in the direction of the optical axis OA.

In various embodiments, the first drive member 401 may be disposed to at least partially overlap the second edge P2 of the circuit board 460 when viewed in the direction of the optical axis OA, and the second drive member 402 may be disposed to at least partially overlap the third edge P3 of the circuit board 460 when viewed in the direction of the optical axis OA.

In various embodiments, the electronic device may further include a middle guide that is disposed between the sensor carrier 430 and the lens holder 413 and that moves in the second axial direction (e.g., the y-axis direction) together with the sensor carrier 430.

In various embodiments, the middle guide 440 may include a first surface 440a, at least a portion of which faces an inner surface of the lens holder 413 and a second surface 440b, at least a portion of which faces the sensor carrier 430. At least one first ball 471 may be disposed on the second surface 440b to provide a rolling frictional force between the middle guide 440 and the sensor carrier 430 when the sensor carrier 430 moves. At least one second ball 472 may be disposed on the first surface 440a to provide a rolling frictional force between the middle guide 440 and the lens holder 413 when the middle guide 440 moves.

In various embodiments, the sensor carrier 430 may have a first recess 439 in which the at least one first ball 471 is partially accommodated. The middle guide 440 may have, on the second surface 440b thereof, a second recess 449 in which the at least one first ball 471 is partially accommodated and that at least partially overlaps the first recess 439 when viewed in the direction of the optical axis OA. Each of the first recess 439 and the second recess 449 may extend longer in the first axial direction (e.g., the x-axis direction) than in the second axial direction. The at least one first ball 471 may roll in the first axial direction (e.g., the x-axis direction) inside the first recess 439 and the second recess 449 when the sensor carrier 430 moves in the first axial direction (e.g., the x-axis direction).

In various embodiments, the middle guide 440 may have, on the first surface 440a thereof, a third recess 448 in which the at least one second ball 472 is partially accommodated. The lens holder 413 may have a fourth recess 418 in which the at least one second ball 472 is partially accommodated and that at least partially overlaps the third recess 448 when viewed in the direction of the optical axis OA. Each of the third recess 448 and the fourth recess 418 may extend longer in the second axial direction (e.g., the y-axis direction) than in the first axial direction. The at least one second ball 472 may roll in the second axial direction (e.g., the y-axis direction) inside the third recess 448 and the fourth recess 418 when the sensor carrier 430 and the middle guide 440 move in the second axial direction (e.g., the y-axis direction).

According to embodiments of the disclosure, an electronic device 300 may include a housing 310 and a camera module 400 that is disposed in the housing 310 and that receives light through a partial area of the housing 310. The camera module 400 may include a lens assembly 420 including a lens L, a lens holder 413 in which the lens assembly 420 is fixedly disposed, a sensor carrier 430 that includes an image sensor 461 at least partially aligned with an optical axis OA of the lens L and a circuit board 460 electrically connected with the image sensor 461 and that moves in a first direction perpendicular to the optical axis OA and a second direction perpendicular to the optical axis OA and the first direction, a first drive member 401 that moves the sensor carrier 430 in the first direction and that includes a first coil 451 disposed on one of the lens holder 413 or the sensor carrier 430 and a first magnet 431 disposed on the other, a second drive member 402 that moves the sensor carrier 430 in the second direction and that includes a second coil 452 disposed on one of the lens holder 413 or the sensor carrier 430 and a second magnet 432 disposed on the other, a fixed substrate 490 adjacent to the sensor carrier 430 and fixed in a specified position, and a connecting member 500 that extends from the circuit board 460 to the fixed substrate 490 and that includes a third area 530 connected to the fixed substrate 490 and having third slits S3 that extend in the second direction and a second area 520 having second slits S2 that extend in the first direction. At least one of the first magnet 431 or the first coil 451 may be disposed to at least partially overlap the third area 530 of the connecting member 500 when viewed in a direction of the optical axis OA, and at least one of the second magnet 432 or the second coil 452 may be disposed to at least partially overlap the second area 520 of the connecting member 500 when viewed in the direction of the optical axis OA.

In various embodiments, the connecting member 500, the circuit board 460, and the fixed substrate 490 may be disposed on substantially the same plane, and at least a portion of the third area 530 may be located between the fixed substrate 490 and the circuit board 460.

In various embodiments, the connecting member 500 may include a bridge that decreases a twist of the connecting member 500, and the bridge may be formed in the third area 530, in the second area 520, or between the third area 530 and the second area 520.

In various embodiments, the connecting member 500 may further include a first area 510 substantially parallel to the third area 530 and connected to the second area 520 and the circuit board 460, and the first area, the second area, and the third area, when viewed in the direction of the optical axis OA, may surround a second edge P2, a third edge P3, and a fourth edge P4 of the circuit board 460 that are connected with each other.

In various embodiments, the camera module 400 may be disposed such that a first edge P1 of the circuit board 460 is adjacent to an edge of the housing 310, or another camera module included in the electronic device 300.

In various embodiments, the connecting member 500 may be configured to transmit an image-related electrical signal generated by the image sensor 461. Each of the first coil 451 and the second coil 452 may be located on the lens holder 413. The camera module 400 may further include a second connecting member 500 that is at least partially located in the lens holder 413 and that extends from the inside of the lens holder 413 to the fixed substrate 490, and the first coil 451 and the second coil 452 may be electrically connected to the second connecting member 500. The second connecting member 500 may be configured to transmit drive signals of the first coil 451 and the second coil 452.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

According to the situation, the expression "adapted to or configured to" used in this disclosure may be used interchangeably with, for example, the expression "suitable for", "having the capacity to", "adapted to", "made to", "capable of", or "designed to" in hardware or software. The expression "a device configured to" may mean that the device is "capable of" operating together with another device or other components. For example, a "processor set to (or configured to) perform A, B, and C" may mean a dedicated processor (e.g., an embedded processor) for performing corresponding operations or a generic-purpose processor (e.g., a CPU or an AP) that performs corresponding operations by executing one or more programs stored in a memory device (e.g., the memory 130).

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. The "module" may be implemented mechanically or electronically and may include, for example, an application-specific integrated circuit (ASIC) chip, field-programmable gate arrays (FPGAs), or a programmable-logic device for performing some operations, which are known or will be developed.

At least a part of an apparatus (e.g., modules or functions thereof) or a method (e.g., operations) according to various embodiments may be implemented by instructions stored in computer-readable storage media (e.g., the memory 130) in the form of a program module. The instructions, when executed by a processor (e.g., the processor 120), may cause the processor to perform functions corresponding to the instructions. The computer-readable storage media may include a hard disk, a floppy disk, a magnetic media (e.g., a magnetic tape), an optical media (e.g., CD-ROM, DVD, magneto-optical media (e.g., a floptical disk)), an embedded memory, and the like. The instructions may include a code made by a compiler or a code executable by an interpreter.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising a camera, wherein the camera includes:
    a lens assembly including a lens;
    a lens holder in which the lens assembly is fixedly disposed;
    a sensor carrier including an image sensor at least partially aligned with an optical axis of the lens and a circuit board electrically connected with the image sensor, the sensor carrier configured to move in a first axial direction perpendicular to the optical axis and a second axial direction perpendicular to the optical axis and the first axial direction;
    a first drive member configured to move the sensor carrier in the first axial direction, the first drive member including a first coil and a first magnet, wherein the first coil is disposed on the lens holder or the sensor carrier and wherein the first magnet is disposed on the lens holder when the first coil is disposed on the sensor carrier or the first magnet is disposed on the sensor carrier when the first coil is disposed on the lens holder;
    a second drive member configured to move the sensor carrier in the second axial direction, the second drive member including a second coil and a second magnet, wherein the second coil is disposed on the lens holder or the sensor carrier and wherein the second magnet is disposed on the lens holder when the second coil is disposed on the sensor carrier or the second magnet is disposed on the sensor carrier when the second coil is disposed on the lens holder;
    a middle guide disposed between the sensor carrier and the lens holder and configured to move in the second axial direction together with the sensor carrier;
    a fixed substrate adjacent to the sensor carrier and fixed in a specified position; and
    a connecting member configured to extend from the circuit board to the fixed substrate, wherein the connecting member, when viewed in a direction of the optical axis, extends to surround at least three interconnected edges of the circuit board,
    wherein the connecting member includes at least one slit configured to extend in an extension direction of the connecting member,
    wherein the middle guide includes an opening area, and
    wherein the first magnet and the second magnet are disposed to pass through the opening area.

2. The electronic device of claim 1, wherein the connecting member includes a first area and a third area configured to extend substantially in a first direction and a second area configured to extend in a second direction perpendicular to the first direction,
    wherein the first area is disposed at least partially parallel to a first edge of the circuit board,
    wherein the second area is disposed at least partially parallel to a second edge of the circuit board, the second edge being connected to the first edge, and
    wherein the third area is disposed at least partially parallel to a third edge of the circuit board, the third edge being connected to the second edge.

3. The electronic device of claim 2, wherein:
    each of the first area and the third area includes first slits configured to extend in the first direction, and
    the second area includes second slits configured to extend in the second direction.

4. The electronic device of claim 2, wherein:
    the first direction is parallel to the second axial direction, and
    the second direction is parallel to the first axial direction.

5. The electronic device of claim 1, wherein the connecting member is located on a similar plane as the circuit board and the fixed substrate.

6. The electronic device of claim 2, wherein the connecting member further includes:
    a first connecting area configured to connect the first area and the first edge of the circuit board, and
    a second connecting area configured to connect the third area and the fixed substrate.

7. The electronic device of claim 2, wherein:
    the circuit board further includes a fourth edge configured to connect the first edge and the third edge, and
    the camera is disposed such that the fourth edge is adjacent to an edge of the electronic device, or another camera included in the electronic device.

8. The electronic device of claim 2, wherein the connecting member includes a bridge configured to extend across the slit, and
wherein the bridge is formed in the first area, in the second area, in the third area, between the first area and the second area, or between the second area and the third area.

9. The electronic device of claim 1, wherein:
the first magnet and the first coil at least partially overlap each other when viewed in the direction of the optical axis, and
the second magnet and the second coil at least partially overlap each other when viewed in the direction of the optical axis.

10. The electronic device of claim 2, wherein the first drive member is disposed to at least partially overlap the second edge of the circuit board when viewed in the direction of the optical axis, and
wherein the second drive member is disposed to at least partially overlap the third edge of the circuit board when viewed in the direction of the optical axis.

11. The electronic device of claim 1, wherein the middle guide includes a first surface and a second surface, wherein at least a portion of the first surface faces an inner surface of the lens holder and at least a portion of the second surface faces the sensor carrier,
wherein at least one first ball is disposed on the first surface to provide a rolling frictional force between the middle guide and the lens holder when the middle guide moves, and
wherein at least one second ball is disposed on the second surface to provide a rolling frictional force between the middle guide and the sensor carrier when the sensor carrier moves.

12. The electronic device of claim 11, wherein:
the sensor carrier includes a first recess in which the at least one first ball is partially accommodated,
the second surface of the middle guide includes a second recess in which the at least one first ball is partially accommodated and the second recess at least partially overlaps the first recess when viewed in the direction of the optical axis,
each of the first recess and the second recess extends longer in the first axial direction than in the second axial direction, and
the at least one first ball rolls in the first axial direction inside the first recess and the second recess when the sensor carrier moves in the first axial direction.

13. The electronic device of claim 12, wherein:
the second surface of the middle guide includes a third recess in which the at least one second ball is partially accommodated,
wherein the lens holder includes a fourth recess in which the at least one second ball is partially accommodated and the fourth recess at least partially overlaps the third recess when viewed in the direction of the optical axis,
wherein each of the third recess and the fourth recess extends longer in the second axial direction than in the first axial direction, and
wherein the at least one second ball rolls in the second axial direction inside the third recess and the fourth recess when the sensor carrier and the middle guide move in the second axial direction.

14. An electronic device comprising:
a housing and a camera disposed in the housing and configured to receive light through a partial area of the housing,
wherein the camera includes:
a lens assembly including a lens;
a lens holder in which the lens assembly is fixedly disposed;
a sensor carrier including an image sensor at least partially aligned with an optical axis of the lens and a circuit board electrically connected with the image sensor, the sensor carrier configured to move in a first direction perpendicular to the optical axis and a second direction perpendicular to the optical axis and the first direction;
a first drive member configured to move the sensor carrier in the first direction, the first drive member including a first coil and a first magnet, wherein the first coil is disposed on the lens holder or the sensor carrier and wherein the first magnet is disposed on the lens holder when the first coil is disposed on the sensor carrier or the first magnet is disposed on the sensor carrier when the first coil is disposed on the lens holder;
a second drive member configured to move the sensor carrier in the second direction, the second drive member including a second coil and a second magnet, wherein the second coil is disposed on the lens holder or the sensor carrier and wherein the second magnet is disposed on the lens holder when the second coil is disposed on the sensor carrier or the second magnet is disposed on the sensor carrier when the second coil is disposed on the lens holder;
a middle guide disposed between the sensor carrier and the lens holder and configured to move together with the sensor carrier;
a fixed substrate adjacent to the sensor carrier and fixed in a specified position; and
a connecting member configured to extend from the circuit board to the fixed substrate, the connecting member including a first area connected to the fixed substrate and having first slits configured to extend in the second direction and a second area having second slits configured to extend in the first direction,
wherein at least one of the first magnet or the first coil is disposed to at least partially overlap the first area of the connecting member when viewed in a direction of the optical axis, and at least one of the second magnet or the second coil is disposed to at least partially overlap the second area of the connecting member when viewed in the direction of the optical axis,
wherein the middle guide includes an opening area, and
wherein the first magnet and the second magnet are disposed to pass through the opening area.

15. The electronic device of claim 14, wherein:
the connecting member, the circuit board, and the fixed substrate are disposed on a similar same plane, and
at least a portion of the first area is located between the fixed substrate and the circuit board.

16. The electronic device of claim 14, wherein the connecting member includes a bridge configured to decrease a twist of the connecting member, and
wherein the bridge is formed in the first area, in the second area, or between the first area and the second area.

17. The electronic device of claim 14, wherein:
the connecting member further includes a third area substantially parallel to the first area and connected to the second area and the circuit board, and
the first area, the second area, and the third area, when viewed in the direction of the optical axis, surround a first edge, a second edge, and a third edge of the circuit board that are connected with each other.

18. The electronic device of claim 17, wherein the camera is disposed such that a fourth edge of the circuit board is adjacent to an edge of the housing, or another camera included in the electronic device.

19. The electronic device of claim 17, wherein:
the connecting member is configured to transmit an image-related electrical signal generated by the image sensor,
each of the first coil and the second coil is located on the lens holder,
the camera further includes an FPCB at least partially located in the lens holder and configured to extend from inside of the lens holder to the fixed substrate, and the first coil and the second coil are electrically connected to the FPCB, and
the FPCB is configured to transmit drive signals of the first coil and the second coil.

\* \* \* \* \*